(12) United States Patent
Hsieh et al.

(10) Patent No.: US 12,388,076 B2
(45) Date of Patent: Aug. 12, 2025

(54) METHOD FOR MAKING MULTI-POROUS LEAD-CARBON ELECTRODE SHEETS ELECTRODE SHEET CASSETTE AND LEAD-CARBON BATTERY

(71) Applicant: National Formosa University, Yunlin County (TW)

(72) Inventors: Shu-Huei Hsieh, Yunlin County (TW); Huai-Jen Wu, Yunlin County (TW); Cun-Hao Xiao, Yunlin County (TW); Chu-Ting Hsieh, Yunlin County (TW); Zhen-An Lee, Yunlin County (TW); Zhi-Xuan Yan, Yunlin County (TW)

(73) Assignee: NATIONAL FORMOSA UNIVERSITY, Yunlin County (TW)

( * ) Notice: Subject to any disclaimer, the term of this patent is extended or adjusted under 35 U.S.C. 154(b) by 939 days.

(21) Appl. No.: 17/528,318

(22) Filed: Nov. 17, 2021

(65) Prior Publication Data

US 2023/0041652 A1    Feb. 9, 2023

Related U.S. Application Data

(60) Provisional application No. 63/223,982, filed on Jul. 21, 2021.

(51) Int. Cl.
*H01M 4/16* (2006.01)
*H01M 4/04* (2006.01)
(Continued)

(52) U.S. Cl.
CPC ............ *H01M 4/16* (2013.01); *H01M 4/043* (2013.01); *H01M 4/587* (2013.01); *H01M 10/12* (2013.01)

(58) Field of Classification Search
CPC ........ H01M 4/16; H01M 4/043; H01M 4/587; H01M 10/12
See application file for complete search history.

(56) References Cited

U.S. PATENT DOCUMENTS

| 4,358,506 A | * | 11/1982 | Intrater | ................... C04B 41/88 427/113 |
| 2007/0117022 A1 | * | 5/2007 | Park | ..................... H01M 4/242 429/218.2 |

(Continued)

FOREIGN PATENT DOCUMENTS

CN    1081231    *    6/2018    .............. H01M 4/14

*Primary Examiner* — Alexander Usyatinsky
(74) *Attorney, Agent, or Firm* — Troutman Pepper Locke LLP; Tim Tingkang Xia, Esq.

(57) ABSTRACT

The present invention discloses a method for making lead-carbon electrode sheets, electrode sheet cassette and lead-carbon battery. The method includes of steps of: oxidizing lead under low-temperature atmosphere; and using a specialized ventilation method for the carbon to coat the oxidized lead. The interface layer of oxidized lead forms a stable interface between the carbon and the lead. Meanwhile, through controlling pressure and temperature, a multi-porous metal composite is formed and the porosity can be penetration paths for air and liquid when the multi-porous metal composite is applied. The lead-carbon composite is applied as a lead-carbon electrode sheet and is further welded as a lead-carbon electrode sheet of a lead-carbon battery. The lead-carbon battery carrying the lead-carbon electrode demonstrates Coulomb efficiency of 100% without heat loss on an unsaturated charge-discharge condition, demonstrating high-efficiency charging and discharging.

19 Claims, 25 Drawing Sheets

(51) Int. Cl.
*H01M 4/587* (2010.01)
*H01M 10/12* (2006.01)

(56) References Cited

U.S. PATENT DOCUMENTS

| | | | |
|---|---|---|---|
| 2007/0204458 A1* | 9/2007 | Fujita | H01M 4/0404 29/730 |
| 2012/0107674 A1* | 5/2012 | Nishino | H01M 50/256 429/163 |
| 2017/0263912 A1* | 9/2017 | Tzeng | H01G 11/30 |

* cited by examiner

METHOD FOR MAKING MULTI-POROUS LEAD-CARBON ELECTRODE SHEETS ELECTRODE SHEET CASSETTE AND LEAD-CARBON BATTERY

RELATED APPLICATION

This application claims the benefit of U.S. provisional patent application Ser. No. 63/223,982, filed Jul. 21, 2021, the contents thereof are incorporated by reference.

BACKGROUND

Field of Invention

The present invention is related to a method, in particular related to a method for making lead-carbon electrode sheets; multi-porous lead-carbon electrode sheets made by coupling lead and carbon is further welded with wires to be electrode sheets of a lead-carbon battery.

Description of Related Art

Recently, green energy has become an issue drawing attention widely. Currently, to cope with intermittent power generation such as wind or solar power, a decentralized power storage system is adopted. Batteries applied to such intermittent power generation system are anticipated to meet two requirements: firstly, higher energy density; secondly, longer battery life under charge and discharge cycles. With development and expansion of green energy, a rapid growth of demands for power storage featuring high energy density and fast charge and discharge could be expected in near future. As a preferred option for green energy microgrid establishment, however, electrochemical battery has drawbacks such as its tendency to be consumed and short battery life in the background art.

To solve issues addressed above, power storage element centering on lithium capacitor is robustly under development. Lithium capacitor is based on electrolyte comprising lithium salts and is charged and discharged by non-Faraday reaction of cathode absorbing and desorbing anions as well as Faraday reaction of anode adsorbing and releasing of lithium ions. In addition, electrodes of lithium capacitors are made of oxides or carbon materials, which increases energy density 10 folds higher than that of electrodes made of activated carbon with non-Faraday reaction. Nonetheless, it remains an unsolvable issue such as battery life and efficiency of charge and discharge. In another aspect, composite lead-carbon battery draws attention as well due to its long battery life which hopefully reduces cost of each cycle of repeated charge and discharge. Notwithstanding, redox potential of a carbon electrode is far lower than that of a lead sheet. Therefore, in most cases discharging voltage of lead-carbon battery is lower than 1.0 V, resulting in low efficiency of power storage.

Composite lead-acid battery developed by Axion is a lead-acid battery in addition of a super capacitor which forms super-capacity electrode by placing activated carbon at cathode. To avoid erosion of interface between activated carbon and lead, an anti-erosive and conductive protecting layer is utilized in the composite lead-acid battery to isolate acidic liquid from the electrode. However, interface of the protecting layer and the electrode has high electric resistance, which immensely influences its capacity. Besides, cost of the protective layer is high and makes it difficult to amortize cost of manufacturing.

Ultrabattery is a lead-carbon battery improved by increasing specific surface area and stable lead-carbon coupling. Specifically, a honeycomb-shaped grid is made of ground carbon fibers and carbonized under nitrogen airflow at 1000° C., and then the grid is electroplated with lead/tin to form a lead-carbon electrode framework. Subsequently, the framework is coated with a mixture comprising carbon fibers and dried for 48 hours at 60° C. before being welded with pure lead wire. Finally, the framework is carbonized into lead-carbon anode with larger capacity and increased battery life. Though such method increases specific surface area of carbon material and successfully couples lead and carbon by electroplating lead/tin after carbon fibers is carbonized at high temperature, procedures of this method is complicated and costly.

In order to increase specific surface area, electroplating of Pb and $PbO_2$ nanowire according to templates is also adopted for inhibiting vulcanization of batteries under rapid charge and discharge. Commercialized anode of batteries composed of $PbO_2$ nanowire/$PbO_2$ cathode and commercialized anode (activated carbon incl.) is replaced in every 200 cycles during HRPSoC charge and discharge tests. Test results showed that, by raising power from 1 C to 10 C, charge and discharge cycle life reaches 1400 cycles and efficiency reaches 90%. Notwithstanding, catalysis of nanowire growth by sputtering gold membrane and washout of polycarbonate (PC) templates by chloroform both raise manufacturing cost of electrodes and derives pollution, making it difficult for mass production.

SUMMARY

For manufacturing electrodes of advanced lead-acid or composite lead-carbon battery, primarily lead paste is coated onto lead grid and aged to obtain better adherence and cohesion. Therefore, during charge and discharge or redox reaction, lead paste tends to detach by volume change and results in depletion of electrodes as usage count of batteries rises. In another aspect, derivative issues such as low efficiency or high manufacturing cost need to be solved when battery life or capacity is improved by composite lead-carbon or lead-acid batteries.

Accordingly, in order to overcome issues of current technologies as described above, the present invention provides a method for making a multi-porous lead-carbon composite electrode comprising steps of: providing a first lead material, a second lead material and a carbon material, coupling a main side of the first lead material to the carbon material, and coupling a main side of the second lead material to the carbon material, so that the carbon material is located between the first lead material and the second lead material to form a lead-carbon sandwich; at a first temperature, producing a swelling pressure from air between the carbon material and the first lead material or the second lead material to ventilate the air; and at the first temperature, exerting an external pressure on the lead-carbon sandwich for 2~10 minutes so as to combine the first lead material, the second lead material and the carbon material to form a lead-carbon electrode sheet, wherein the first temperature ranges from 300 to 360° C. and the external pressure ranges from 70 to 120 kg/m².

In one or various embodiments, between the lead-carbon sandwich forming step and the swelling pressure producing step, the method further comprises steps of: placing the lead-carbon sandwich in a hot press mold, wherein the hot press mold comprises a convex mold and a concave mold; wherein the convex mold comprising a plurality of convex mold exhaust holes and a convex mold ventilating groove, the convex mold exhaust holes dispersed evenly along an inner side of convex periphery of the convex mold, the convex mold ventilating groove formed along an outer side of convex periphery of the convex mold; the concave mold comprising a plurality of concave mold exhaust holes and a concave mold ventilating groove, the concave mold exhaust holes dispersed evenly along an inner side of concave periphery of the concave mold corresponding to the convex mold exhaust holes, the concave mold ventilating groove spiraling along the inner side of periphery of the concave mold and towards geometric center of the concave mold; the convex mold ventilating groove connects to the concave mold ventilating groove for ventilation when the convex mold combines with the concave mold in a corresponsive manner.

In one preferred embodiment, the first temperature is 320° C. and the external pressure is 90 kg/m$^2$.

In one or various embodiments, after the exerting external pressure step, the method further comprises a heat treatment comprising steps of: heating the lead-carbon electrode sheet to a third temperature at a depressurized atmosphere; and at the third temperature, heat treating the lead-carbon electrode sheet for 1~3 hours, wherein the third temperature ranges from 500 to 700° C. and the depressurized atmosphere ranges from −600 to −400 mmHg.

In one preferred embodiment, the lead-carbon electrode sheet is heat treated for 2 hours, the third temperature is 600° C., and the depressurized atmosphere is −500 mmHg.

In some embodiments, before providing the carbon material, the method further comprises cutting the carbon material from carbon cloth into carbon pieces or carbon fibers, wherein the carbon material comprises no carboxyl group.

In preferred embodiments, the carbon material comprises 45~56% aromatic group, 4~6.5% hydroxyl group, 12~15.5% epoxy group, and 28~33% carbonyl group from atomic perspective.

In one or various embodiments, before providing the first lead material and the second lead material, the method further comprises a pre-treatment comprising steps of: at a second temperature, oxidizing the first lead material and the second lead material in an ambient atmosphere, wherein the second temperature ranges from 0 to 400° C.

In one preferred embodiment, the first temperature is 320° C. and the external pressure is 90 kg/m$^2$, the lead-carbon electrode sheet is heat treated for 2 hours, the third temperature is 600° C., and the depressurized atmosphere is −500 mmHg.

In another aspect, the present invention provides an electrode sheet cassette comprising: a first lead-carbon electrode sheet made by the aforementioned method; a second lead-carbon electrode sheet made by the aforementioned method; and at least one absorbable glass fiber pad, wherein the absorbable glass fiber pad is provided between the first lead-carbon electrode sheet and the second lead-carbon electrode sheet.

In one another aspect, the present invention provides a lead-carbon battery comprising: a cathode contact point; an anode contact point; an electrolyte; at least one cathode electrode sheet cassette as the aforementioned electrode sheet cassette, the cathode electrode sheet cassette is provided in the electrolyte and connected to the cathode contact point by wire-welding; and at least one anode electrode sheet cassette as the aforementioned electrode sheet cassette, the anode electrode sheet cassette is provided in the electrolyte and connected to the anode contact point by wire-welding.

In some embodiments, the first lead material comprises a first welding point at periphery of the first lead material and the second lead material comprises a second welding point at periphery of the second lead material, wherein the first and the second welding points are provided for welding the lead-carbon electrode to electrode contact points of the lead-carbon battery.

The lead-carbon electrode sheet in the present invention forms lead nanoparticles as well as porous structure by unsaturated charge and discharge, and the lead nanoparticles, porous structure and lead sheet form one piece with strong bonding force. Therefore, capacity of the lead-carbon battery is increased as cycle number of charge and discharge multiplies. The lead-carbon battery has long battery life and manufacturing process is simple, which achieves cost reduction.

DESCRIPTION OF THE DRAWINGS

The present invention can be more fully understood by reading the following detailed description of the embodiment, with reference made to the accompanying drawings as follows.

DETAILED DESCRIPTION OF THE INVENTION

According to the foregoing features, the effects of the lead-carbon electrode sheet and the method for producing the same can be explicitly disclosed by following embodiments.

Figure 1:
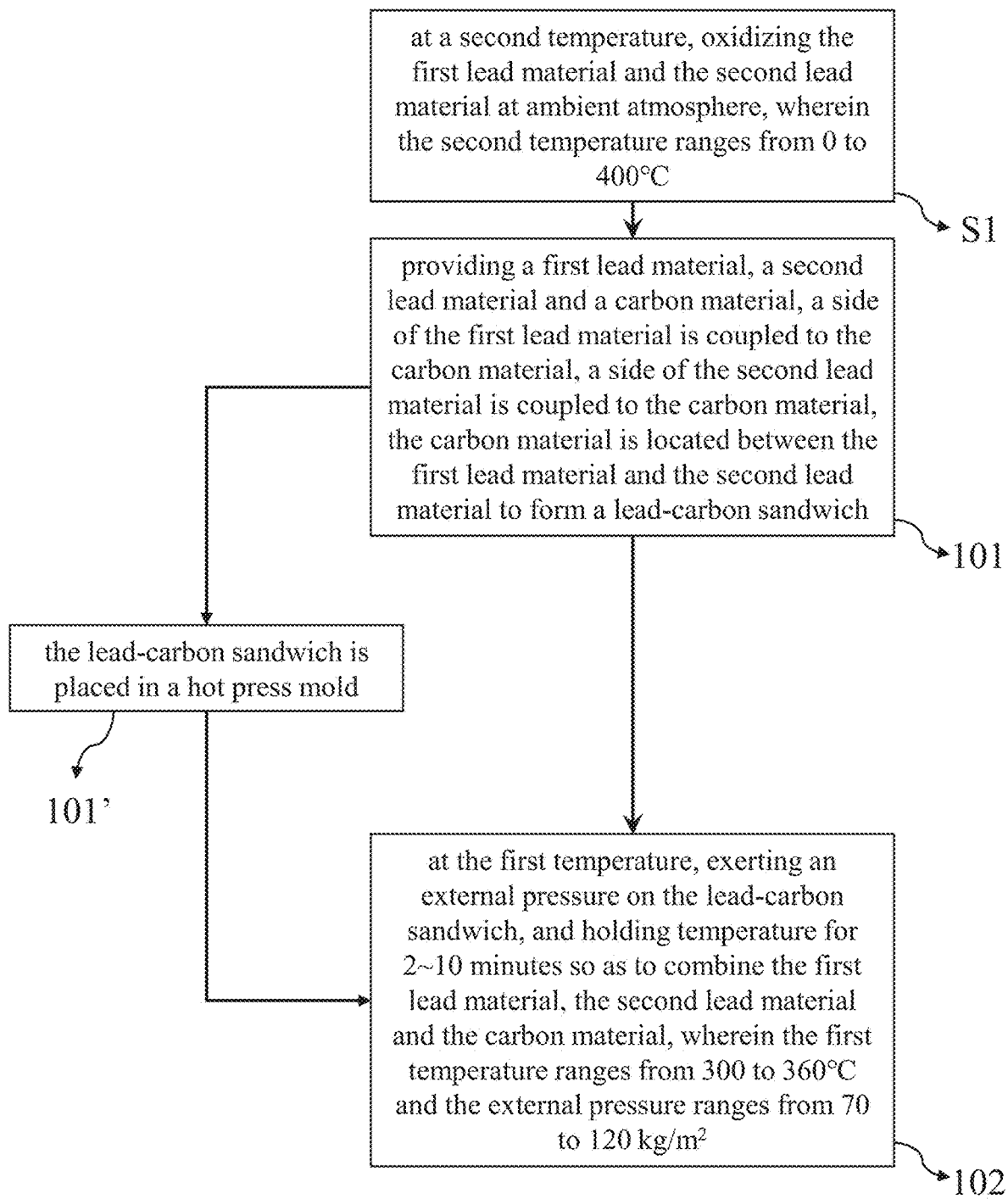
FIG. 1 is a flow chart of a method for making a lead-carbon electrode sheet in the present invention.

Please refer to FIG. 1, which discloses a method for producing a lead-carbon electrode sheet to an embodiment of the present invention. The method comprises steps of:

Step 101: a first lead material, a second lead material and a carbon material are provided, and a main side of the first lead material is coupled to the carbon material, a main side of the second lead material is coupled to the carbon material, and the carbon material is located between the first lead material and the second lead material to form a lead-carbon sandwich;

Step 102: at a first temperature, an external pressure is exerted on the lead-carbon sandwich, and temperature is held for 2~10 minutes so as to combine the first lead material, the second lead material and the carbon material to form a lead-carbon electrode sheet, wherein the first temperature ranges from 300 to 360° C. and the external pressure ranges from 70 to 120 kg/m$^2$.

In one or various preferred embodiments, between the lead-carbon sandwich forming step and the swelling pressure producing step, the method further comprises a step 101': the lead-carbon sandwich is placed in a hot press mold 2. Please refer to FIG. 2A, which is a top view of one preferred embodiment of the hot press mold 2. The hot press mold 2 comprises a convex mold 21 and a concave mold 22, wherein the convex mold 21 comprises a plurality of convex mold exhaust holes 211 and a convex mold ventilating groove 212, the convex mold exhaust holes 211 disperse evenly along inner side of convex periphery of the convex mold 21, the convex mold ventilating groove 212 is formed along outer side of convex periphery of the convex mold 21; the concave mold 22 comprises a plurality of concave mold exhaust holes 221 and a concave mold ventilating groove 222, the concave mold exhaust holes 221 disperse evenly along inner side of concave periphery of the concave mold 22 corresponding to the convex mold exhaust holes 211, the concave mold ventilating groove 222 spirals along the inner side of periphery of the concave mold 22 and towards geometric center of the concave mold 22, wherein the convex mold ventilating groove 212 connects to the concave mold ventilating groove 222 for ventilation when the convex mold 21 combines with the concave mold 22 in a corresponsive manner.

In particular, air in interlayers of the lead-carbon sandwich produces an internal swelling pressure in response to the external pressure. The internal swelling pressure drives the air to flow along the concave mold ventilating groove 222 towards the convex mold ventilating groove 212. Subsequently, the air flows along the convex mold ventilating groove 212 towards the convex mold exhaust holes 211 and the concave mold exhaust holes 221. Eventually, the air is ventilated from the hot press mold 2. Such design allows the internal swelling pressure to promote lead material coating carbon material to form the lead-carbon electrode sheet when the external pressure is applied to the hot press mold 2. Please refer to FIG. 2B, which is a perspective of coupling convex mold 21 and concave mold 22 of the hot press mold 2. Preferably, the concave mold 22 further comprises a concave spillover groove 223 and an alignment pin 224. The concave spillover groove 223 protrudes from outer side of concave periphery of the concave mold 22 and forms a groove structure. When the external pressure is applied to the lead-carbon sandwich, the alignment pin 224 fixes the lead-carbon sandwich at bottom of the concave mold 22. Under hot pressing, lead material is half-molten. By corresponsive effects of the internal swelling pressure, the half-molten lead material spills towards concave periphery of the concave mold 22 and flows into the concave spillover groove 223. Users can remove the lead-carbon electrode sheet from the hot press mold 2 by solidified lead in the concave spillover groove 223 after the lead-carbon electrode sheet is completed.

Figure 2A:
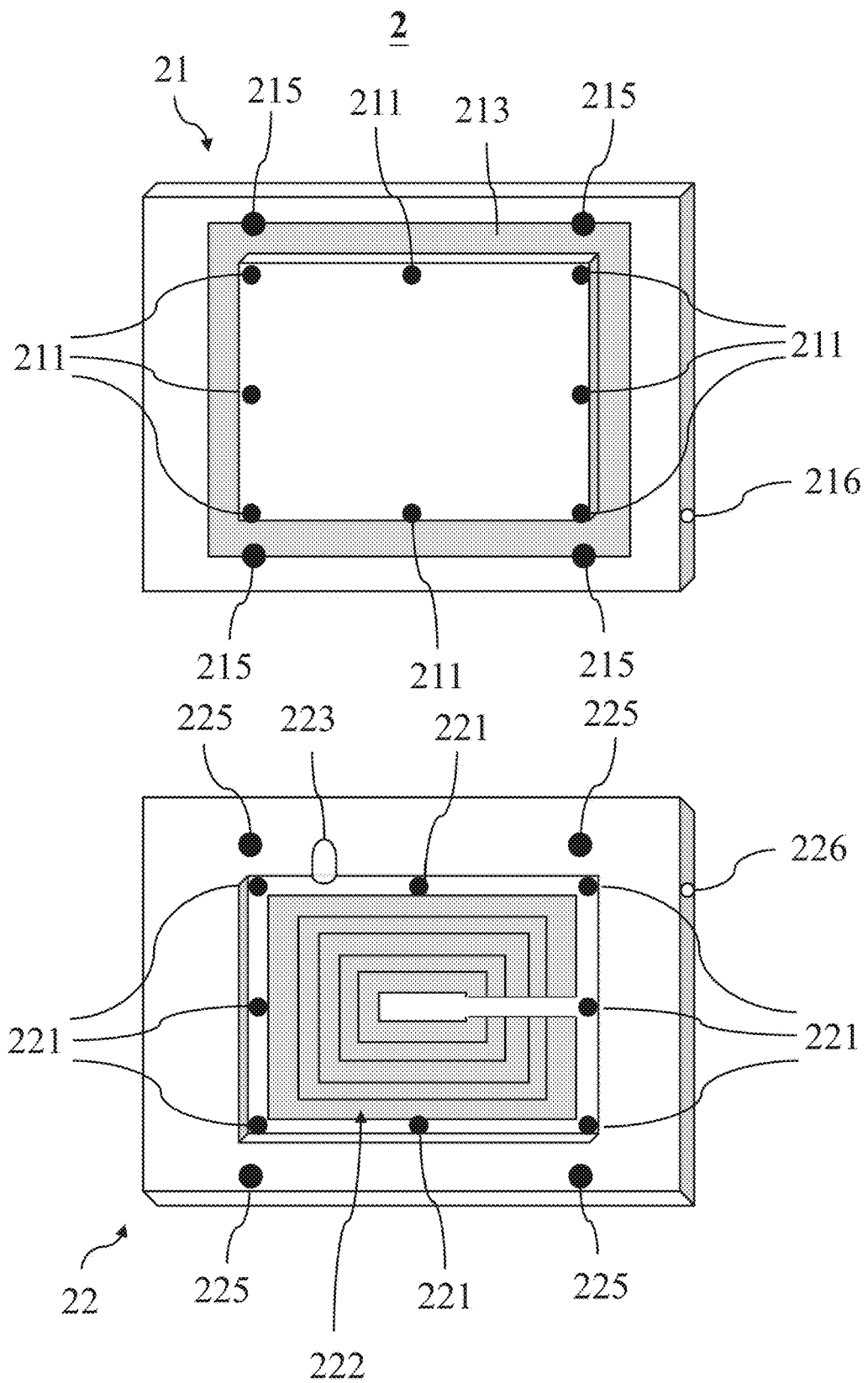
FIG. 2A is a top view of a preferred embodiment of hot press mold in the present invention.

Please further refer to FIG. 2A. In case that the external pressure and the internal swelling pressure produce an excessive pressure inside the mold, preferably, the convex mold 21 further comprises a convex mold spillover groove 213. The convex mold spillover groove 213 protrudes from outer side of convex periphery and forms a groove structure. When the external pressure is applied to the lead-carbon sandwich, under interaction of the external pressure and the internal swelling pressure, half-molten lead material flows towards outer side of convex periphery and reaches the convex mold spillover groove 213, and pressure is therefore relieved.

Figure 2B:
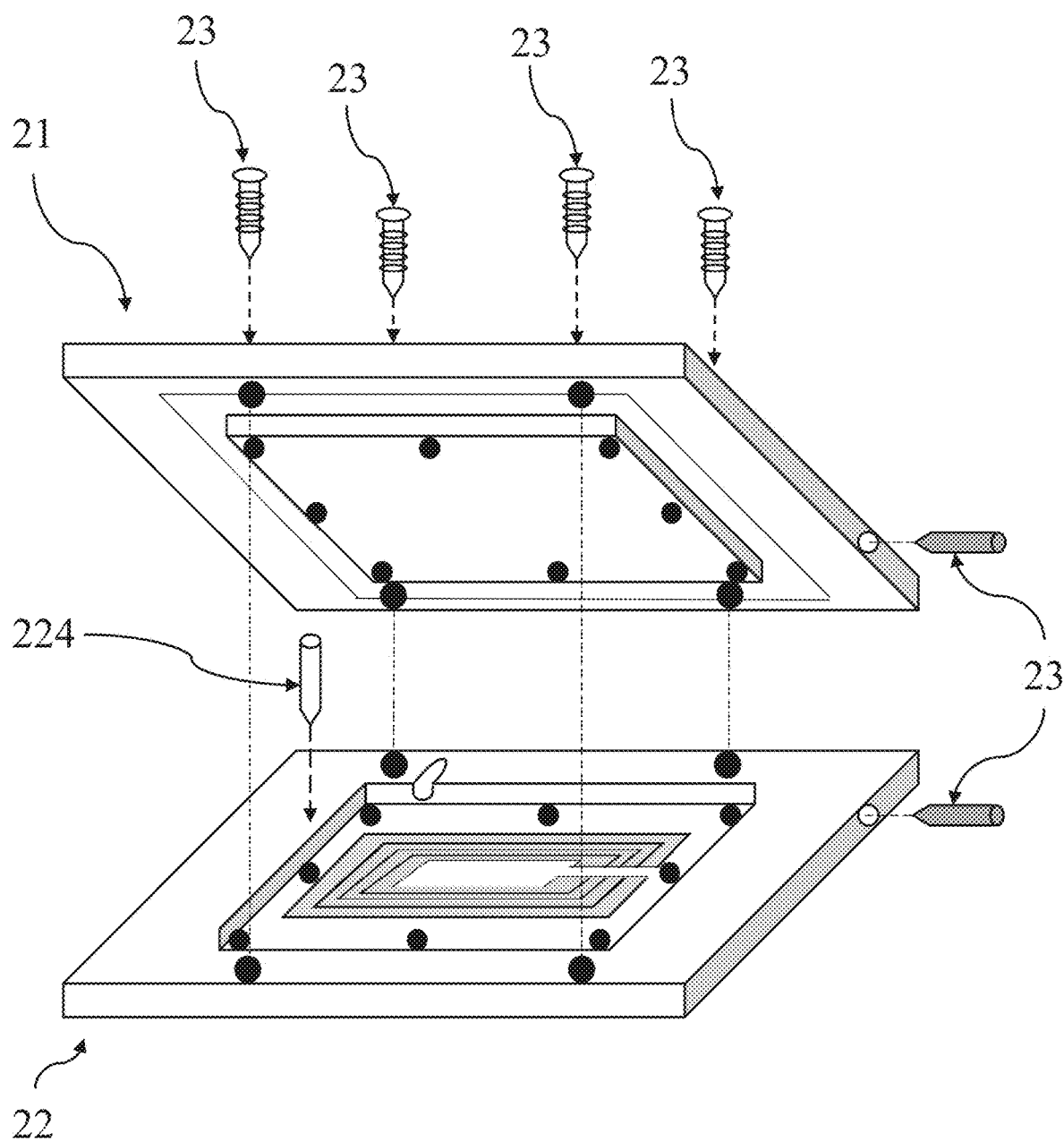
FIG. 2B is a perspective of coupling convex mold and concave mold of hot press mold in the present invention.
Figure 2C:
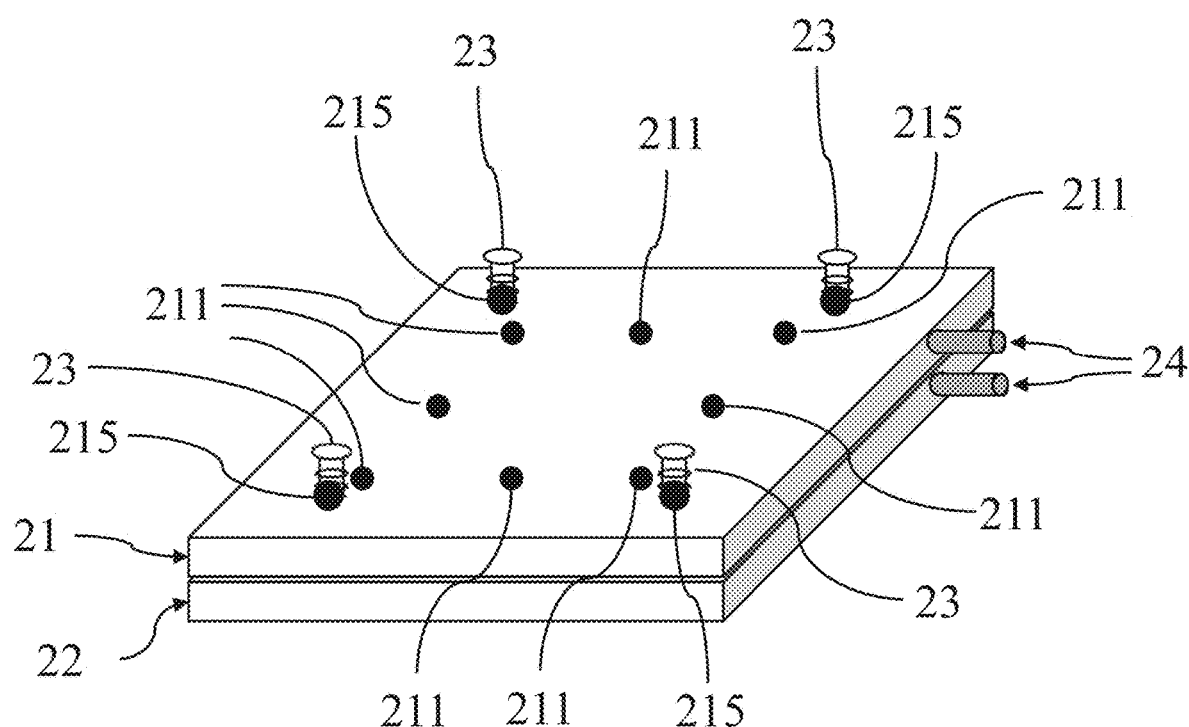
FIG. 2C is a side view of convex mold and concave mold of hot press mold after coupling and fixing in the present invention.

Please refer to FIG. 2A to 2C. FIG. 2C is a side view of convex mold 21 and concave mold 22 of the hot press mold 2 after coupling and fixing. Preferably, the convex mold 21 further comprises a plurality of convex mold lock bores 215 and the concave mold 22 further comprises a plurality of concave mold lock bores 225. The convex mold lock bores 215 disperse evenly along the outer side of convex periphery of the convex mold 21. The concave mold lock bores 225 disperse evenly along outer side of concave periphery of the concave mold 22 corresponding to the convex mold lock bores 215. When the convex mold 21 couples to the concave mold 22 in a corresponsive manner, the convex mold lock bores 215 and the concave mold lock bores 225 are joined up mutually for a plurality of fasteners 23 to fasten the hot press mold 2. The fasteners 23 can be screws, bolts, nails, tacks, pins, rods or any other elements capable of fastening two or more objects.

Please continue to refer to FIG. 2A to 2C. Preferably, the convex mold 21 comprises a convex mold inserting hole 216 and the concave mold 22 comprises a concave mold inserting hole 226. The convex mold inserting hole 216 is located at side face of the convex mold 21 outer periphery. The concave mold inserting hole 226 is located at side face of the concave mold 22 outer periphery. The convex mold inserting hole 216 and the concave mold inserting hole 226 are for insertion of a temperature sensor 24. The temperature sensor 24 allows users to observe temperature of the hot press mold 2 when pressing the lead-carbon electrode sheet. The temperature sensor 24 can be thermistor, thermal couple, wire-type thermal couple or any other thermometer. More preferably, the concave mold inserting hole 226 is located at side face of outer periphery corresponding to the convex mold inserting hole 216.

In some embodiments, the method further comprises a pre-treatment step before providing the first lead material and the second lead material, the pre-treatment comprises a step of:

produced by Taiwan Carbon Technology Co., Ltd. In other embodiments, carbon fiber cloths produced by various manufacturers are utilized, for example, activated carbon fiber (ECF) produced by Chemviron Carbon SA or carbon fiber cloths (PCF) produced by Formosa Plastics Corporations for reinforcement of general construction. The aforementioned activated carbon fiber is medical grade carbon cloth with a full spectrum of functional groups including phenol

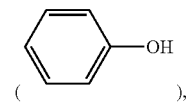

carboxylic group (R—COOH), carbonyl group (R—C=O), aromatic carbon group (R—C—C/C=C), hydroxyl group (R—OH) and epoxy

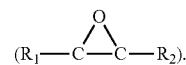

Figure 3:
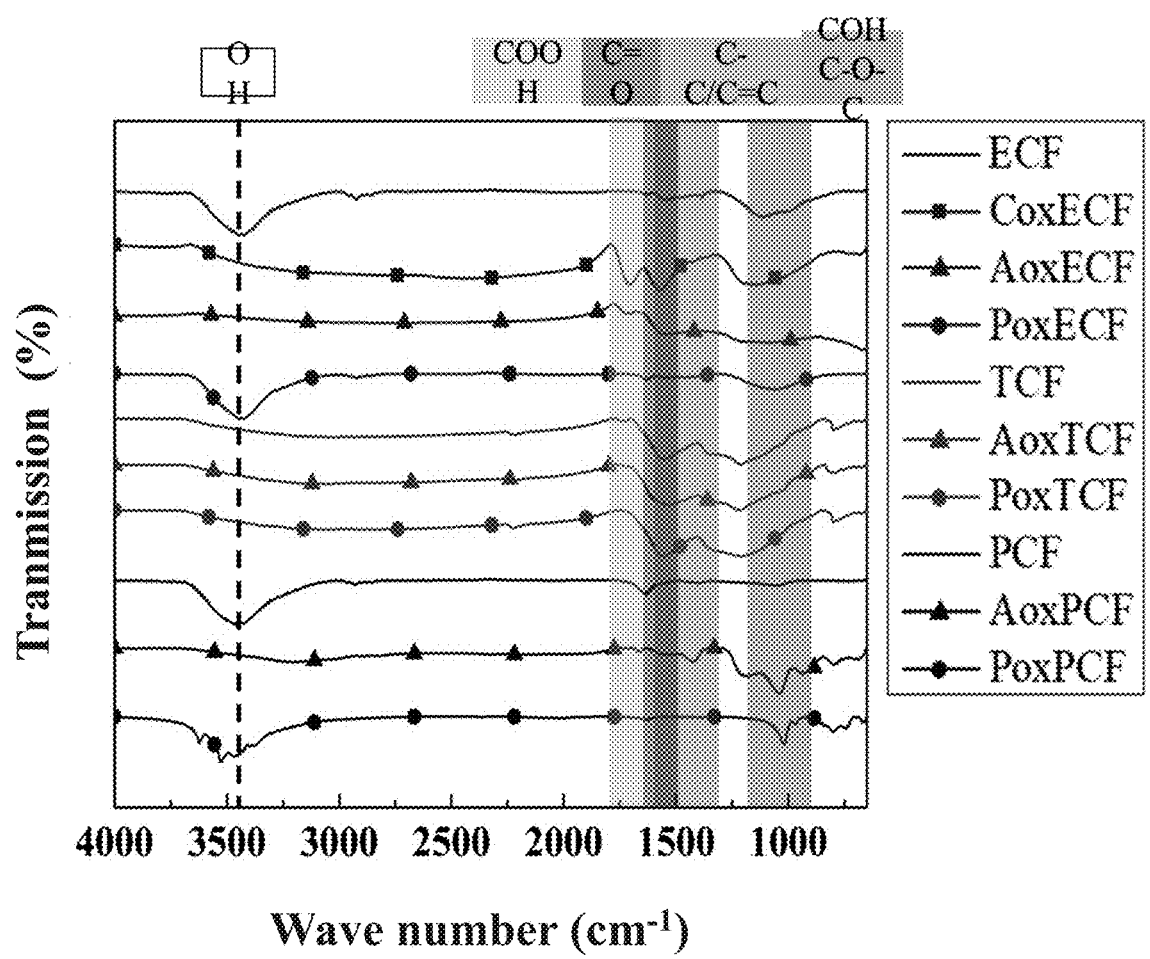
FIG. 3 is a Fourier-transform infrared spectrum to illustrate functional group detecting results of carbon cloth produced by various manufacturers.

Please refer to FIG. 3, which is a Fourier-transform infrared spectroscopy of carbon cloths produced by the aforementioned manufacturers. ECF is activated carbon fiber produced by Chemviron Carbon SA in England, and TCF is fireproof fiber cloth produced by Taiwan Carbon Technology Co., Ltd., while PCF is carbon fiber cloths produced by Formosa Plastics Corporations for reinforcement of general construction. In some embodiments, the foregoing carbon cloths are oxidized, for example, by chemical oxidation (Cox), heat oxidation in air (Aox) or plasma treatment (POX). Please refer to Table 1, which illustrates ratio variety of functional groups on carbon cloths produced by each manufacturer, wherein TCF contains no carboxylic group (COOH) modification after any of the aforementioned process (TCF, AoxTCF, PoxTCF).

TABLE 1

| Samples | atomic (%) | | | | | |
|---|---|---|---|---|---|---|
| | C—C/C=C 284.6 eV | C—OH 286 eV | C—O—C 286.3 eV | C=O 287 eV | COOH 288.4 eV | π-π* 290 eV |
| ECF | 68.98 | 10.87 | 12.41 | 2.17 | 5.57 | — |
| CoxECF | 63.69 | 3.84 | 3.87 | 12.17 | 11.08 | 5.35 |
| AoxECF | 61.61 | 12.21 | 9.39 | 11.22 | 5.21 | 0.36 |
| PoxECF | 48.23 | 20.19 | 1.12 | 10.94 | 19.07 | 0.45 |
| TCF | 48.05 | 5.92 | 14.26 | 31.77 | — | — |
| AoxTCF | 54.02 | — | 8.38 | 27.65 | — | 9.95 |
| PoxTCF | 40.55 | 23.78 | — | 26.95 | — | 8.72 |
| PCF | 78.28 | 5.22 | 3.54 | 5.06 | 7.90 | — |
| AoxPCF | 54.80 | 7.66 | 5.89 | 20.23 | 5.17 | 6.25 |
| PoxPCF | 65.18 | 10.69 | 8.68 | 4.47 | 6.09 | 4.89 |

Step S1: at a second temperature, the first lead material and the second lead material are oxidized in an ambient atmosphere, wherein the second temperature ranges from 0 to 400° C.

Preferably, before the carbon material is provided, the carbon material is cut from carbon cloth into carbon pieces or carbon fibers.

Preferably, the carbon material comprises no carboxyl group (R—COOH); for example, fireproof fiber cloth (TCF)

The aforementioned step S1 is a process step depending on experimental conditions or environmental options. Specifically, lead oxide grows on surface of lead material by ambient oxidation. Partially, lead oxide could be interlayer of carbon material and lead material coupling when the external pressure is applied to lead material. Lead oxide allows lead material to coat carbon material of coupled lead-carbon electrode sheet. The mechanism is further elaborated as following: lead material is half-molten at the first temperature; when the external pressure applied to the hot press mold 2 reaches 70 to 120 kg/m$^2$, in addition to pressure transferred by convex mold 21 and concave mold 22, air inside the hot press mold 2 produces a swelling pressure acting on solid-liquid interface of lead and carbon to drive half-molten lead material to penetrate fiber structure of carbon material; after natural cooling, carbon fiber structure is immersed in half-molten lead material and coated gradually along with solidifying lead material. More specifically, lead oxide wets carbon material. Surface tension of lead dioxide (132 mN/m$^2$) is lower than or similar to that of carbon material (100~200 mN/m$^2$). Therefore, the interlayer formed of lead oxide is able to wet carbon material and couples lead and carbon material intensively. Consequently, lead-carbon contact face with high electrochemical stability is formed. The aforementioned process makes lead material form a more complete coating structure, resulting in a more compacted lead-carbon electrode sheet with higher electric capacity. Disclosed in the present invention is a multi-porous metal composite material formed of coupling heterogenous materials lead and carbon, wherein pores are reserved as channels for gas or liquid, which is advantageous for end uses. The foregoing multi-porous metal composite material forms tiny pores by coupling lead and carbon materials through a specific design of the hot press mold 2. Such design allows ventilation of air simultaneously along with lead-carbon coupling under conditioning of external pressure, internal swelling pressure and temperature. The multi-porous metal composite material reserves pores for end uses and convenient for passing through of air or liquid such as electrolyte, electrochemical substances, etc.

Figure 4A:
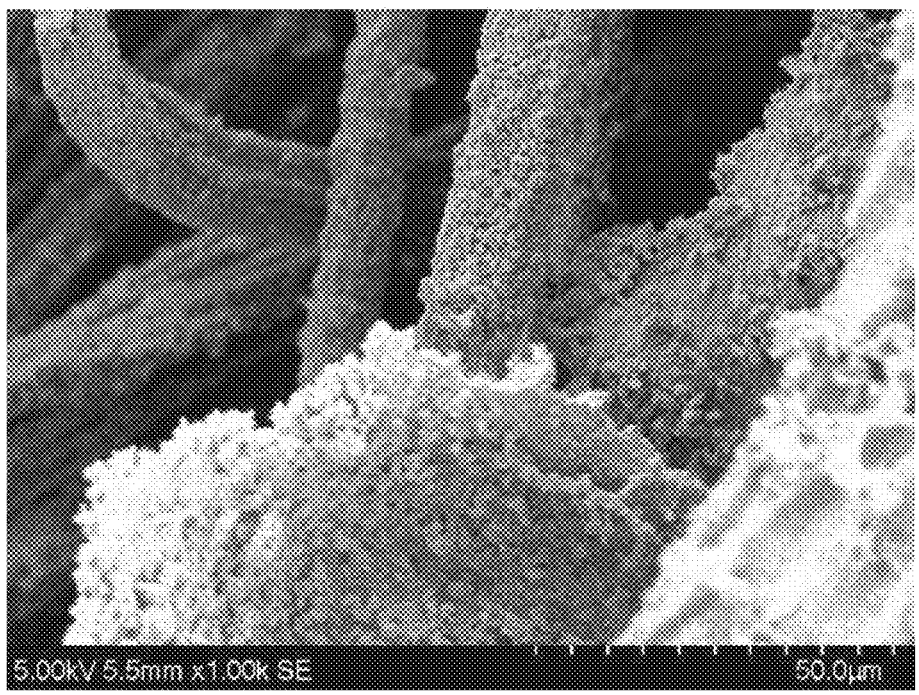
FIG. 4A is a 1000× scanning electron microscopy picture of lead-carbon electrode sheet surface after nitric acid erosion in the present invention.
Figure 4B:
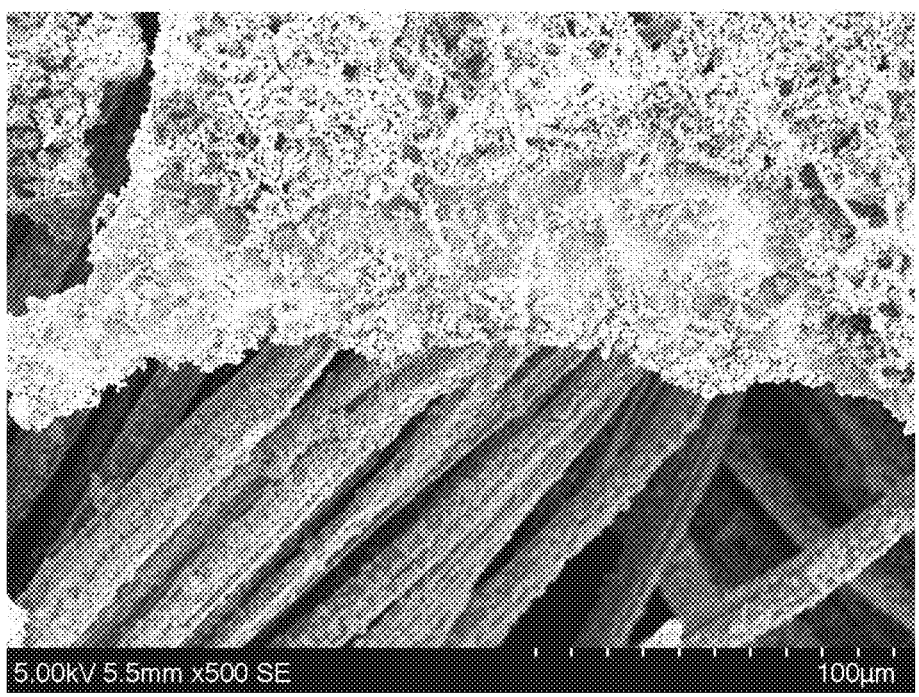
FIG. 4B is a 5000× scanning electron microscopy picture of lead-carbon electrode sheet surface after nitric acid erosion in the present invention.

Please refer to FIG. 4A to 4B which are scanning electron microscopy pictures of lead-carbon electrode sheet surface after nitric acid erosion in the present invention. Coupling status of lead and carbon fibers could be observed. After erosion of lead carbon electrode sheet by 10% nitric acid, a full coating of lead on surface of carbon fibers is exposed. Carbon fibers in pores of lead sheet are also completely coated by lead. Above all, density of lead and carbon materials coupling of the lead-carbon electrode sheet in the present invention is clearly illustrated.

Figure 5:
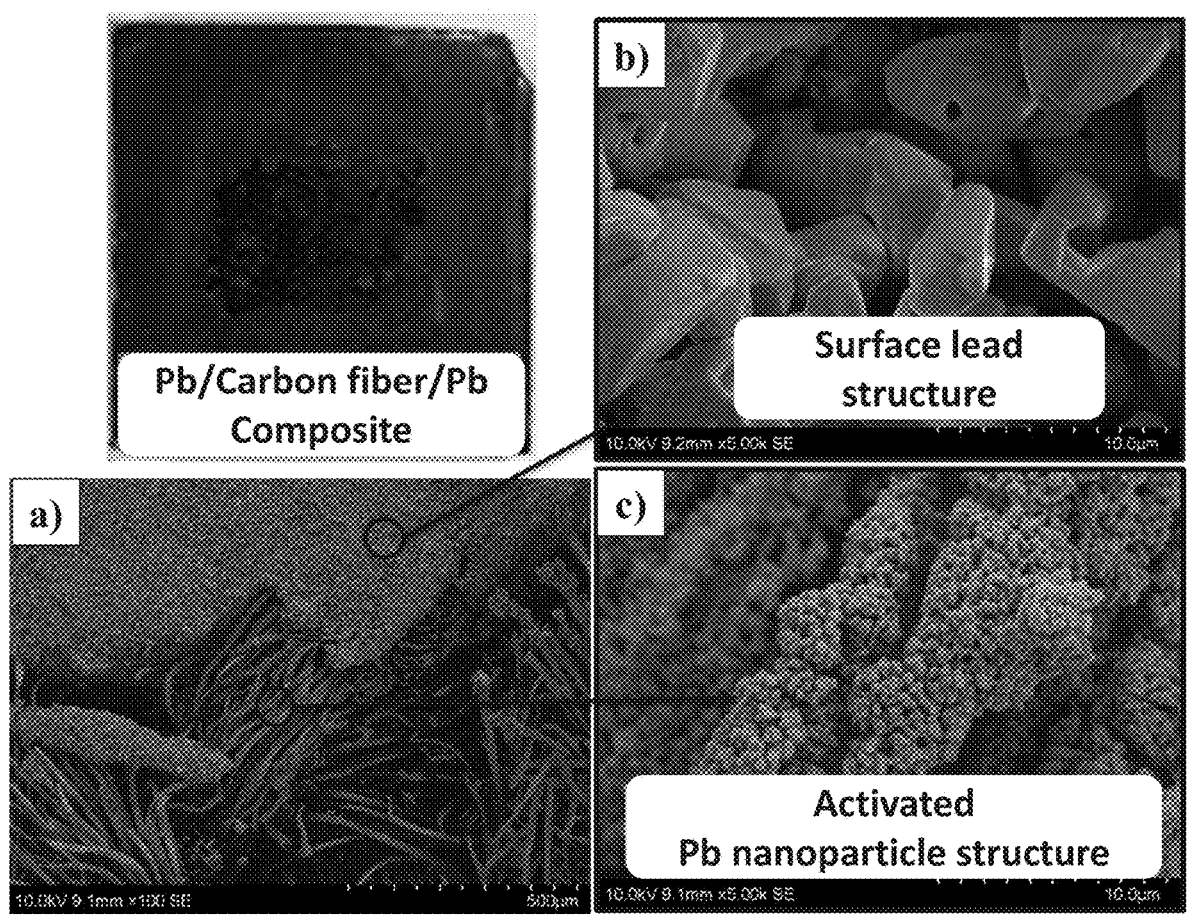
FIG. 5 is a scanning electron microscopy picture of lead-carbon electrode sheet surface after cyclic voltammetry test.

Please refer to FIG. 5, which is a scanning electron microscopy picture of lead-carbon electrode sheet surface after cyclic voltammetry test; after cyclic voltammetry, lead sulfate particles are formed on both lead surface and carbon fibers. In comparison of picture b) and c) in FIG. 5, nanoparticles of lead sulfate gather more densely on carbon fibers than on lead material surface. The nanoparticles of lead sulfate are formed and attach to surface of carbon fibers during cyclic voltammetry due to electrochemical reactions when electrolytes enter lead material surface or pores of lead-carbon electrode sheet. The aforementioned lead sulfate nanostructure continues to accumulate and increases electric capacity of lead-carbon electrode sheet after multiple cycles of cyclic voltammetry tests.

Figure 6:
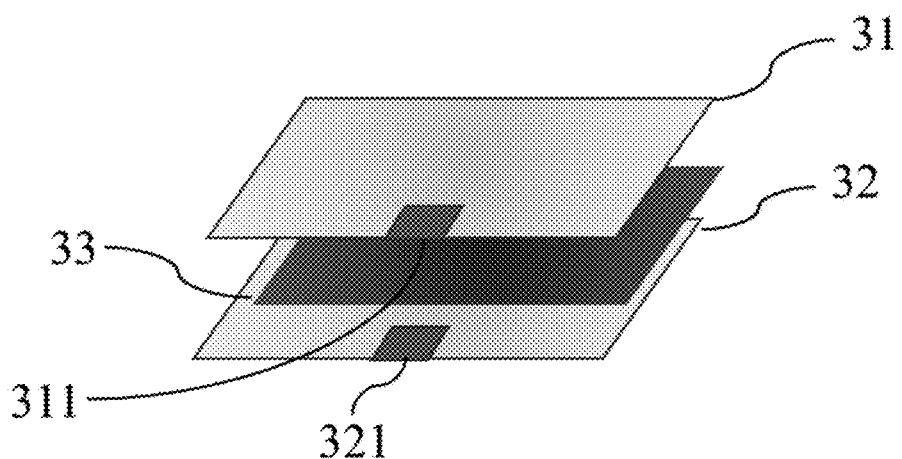
FIG. 6 is a schematic diagram to illustrate lead-carbon coupling of lead-carbon electrode sheet in the present invention.

Please refer to FIG. 6, which is a schematic diagram to illustrate lead-carbon coupling of lead-carbon electrode sheet 3 in the present invention. The lead-carbon electrode sheet 3 comprises a first lead material 31, a second lead material 32 and a carbon material 33, wherein a side of the first lead material 31 is coupled to the carbon material 33, a side of the second lead material 32 is coupled to the carbon material 33; a lead-carbon sandwich is formed when the carbon material 33 is located between the first lead material 31 and the second lead material 32; at a first temperature, an external pressure is exerted on the first lead material 31, the second lead material 32 and the carbon material 33 and temperature is held for 2 to 10 minutes so as to coupling the first lead material 31, the second lead material 32 and the carbon material 33; the first temperature ranges from 300 to 360° C. and the external pressure ranges from 70 to 120 kg/m$^2$.

In preferred embodiments, the first lead material 31 and the second material 32 are further processed by a pre-treatment before the first lead material 31 and the second lead material 32 are provided, and the pre-treatment comprises a step S1: at a second temperature, the first lead material 31 and the second lead material 32 are oxidized in an ambient atmosphere, wherein the second temperature ranges from 0 to 400° C.

Preferably, before the carbon material 33 is provided, the carbon material 33 is further cut from carbon cloth into carbon pieces or carbon fibers and the carbon material comprises no carboxyl group.

Preferably, the first lead material 31 comprises a first welding point 311 neighboring to periphery of the carbon material 33, and the second lead material 32 comprises a second welding point 321 corresponding to the first welding point 311 and the second welding point 321 neighbors to periphery of the carbon material 33. Both welding points are for welding the lead-carbon electrode to electrode contact points of the lead-carbon battery.

Figure 7:
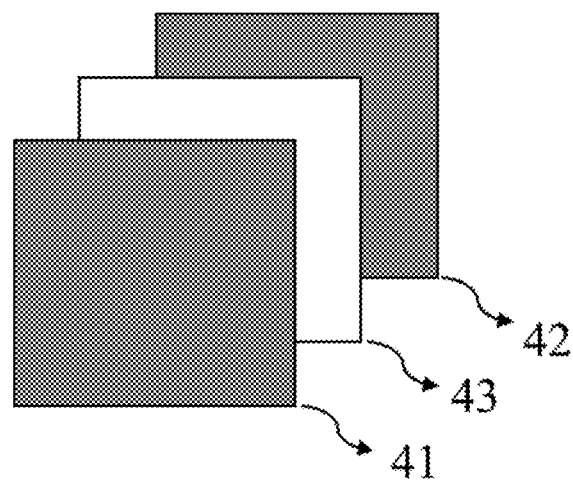
FIG. 7 is a schematic diagram to illustrate disassembly of electrode sheet cassette in the present invention.

Please refer to FIG. 7, which discloses an electrode sheet cassette to one embodiment of the present invention. The electrode sheet cassette comprises a first lead-carbon electrode sheet 41 as the aforementioned lead-carbon electrode sheet 31, a second lead-carbon electrode sheet 42 as the aforementioned lead-carbon electrode sheet 32 and at least one absorbable glass fiber pad 43, wherein the absorbable glass fiber pad 43 is provided between the first lead-carbon electrode sheet 41 and the second lead-carbon electrode sheet 42. In one preferred embodiment, the electrode sheet cassette 4 further comprises a lead sheet, wherein the lead sheet is a pure lead sheet or a pure lead sheet coated of lead paste.

Disclosed to yet another embodiment of the present invention is a lead-carbon battery comprising: a cathode contact point; an anode contact point; an electrolyte, preferably, the electrolyte is a 30~40% sulfate solution; at least one cathode electrode sheet cassette as the aforementioned electrode sheet cassette 4, and the cathode electrode sheet cassette is provided in the electrolyte and connected to the cathode contact point by wire-welding; at least one anode electrode sheet cassette as the electrode sheet cassette 4, and the anode electrode sheet cassette is provided in the electrolyte and connected to the anode contact point by wire-welding. In one or various embodiments, the lead-carbon battery demonstrate 100% Coulomb efficiency without heat loss under 2 C charge and 10 C discharge, but not limited by this; preferably, ratio of lead-carbon electrode sheet connected to the cathode contact point to lead-carbon electrode sheet connected to the anode contact point is 1:1, 1:2, 1:3, 2:1, 2:2, 2:3, 3:1, 3:2 or 3:3, but not limited by this.

Described herein are examples and experimental examples to further illustrate technical features and efficacy of the provided means in the present invention.

Example 1

Lead material, carbon cloth, paper and carbon sheet were weighed and placed in concave groove of concave mold in an order of lead material, carbon cloth, lead material, 2 papers and 2 carbon sheets. In example 1, the carbon cloth was an activated carbon fiber (ECF) produced by Chemviron Carbon SA. Before the carbon cloth was placed in a hot press mold, ECF was oxidized by chemical process to be CoxECF. The lead-carbon sandwich was then covered by a convex mold of the hot press mold, and then the hot press mold was locked by screws. A temperature sensor was then placed to convex mold and concave mold, respectively. The foregoing hot press mold was transferred to a hot press and pressurized until heating plate contacts convex mold and concave mold and then to 90 kg/cm². The hot press was heated to 300° C. and screws were tightened again. When concave mold was heated to 320° C. and temperature was held at 320° C. In 5 minutes, entire hot press mold was heated to 360° C. and heating sequence was terminated. Hot press mold cools down naturally to 300° C. and unloaded from the hot press. Hot press mold was then removed and lead-carbon electrode sheet was obtained.

Figure 8A:
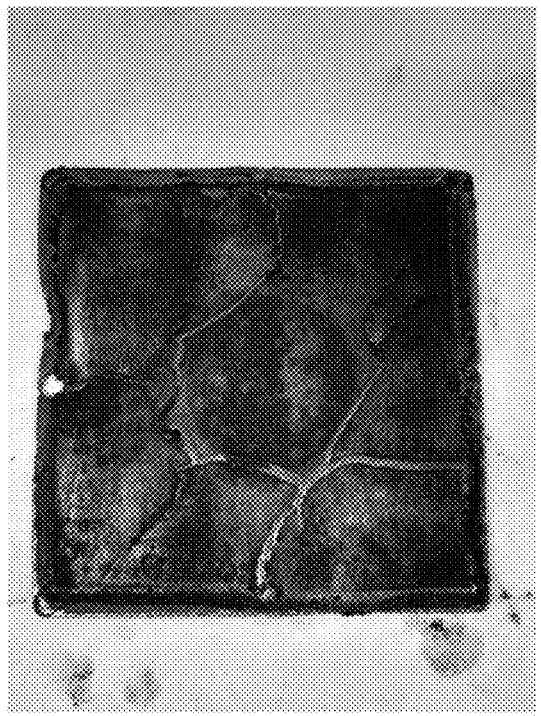
FIG. 8A illustrates contact surface of lead-carbon electrode sheet 11181 to convex mold of hot press mold.
Figure 8B:
FIG. 8B illustrates contact surface of lead-carbon electrode sheet 11181 to concave mold of hot press mold.

As indicated in FIG. 8A is contact surface of lead-carbon electrode sheet 11181 to convex mold of hot press mold. As indicated in FIG. 8B is contact surface of lead-carbon electrode sheet 11181 to concave mold of hot press mold.

Figure 9A:
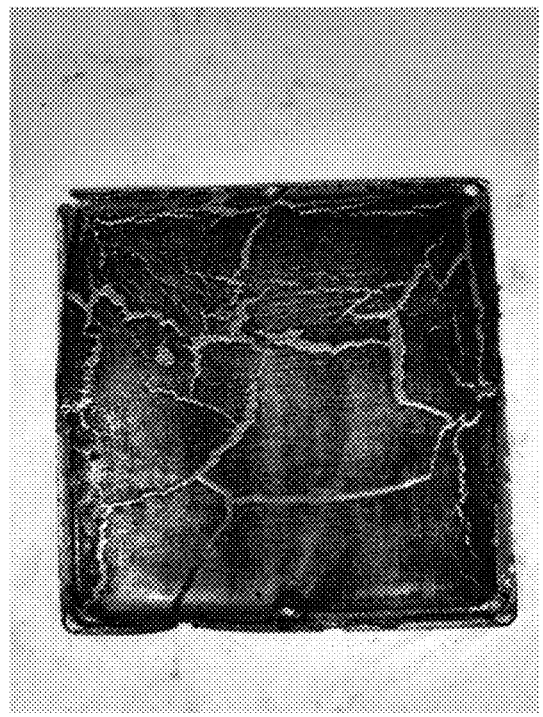
FIG. 9A illustrates contact surface of lead-carbon electrode sheet 11182 to convex mold of hot press mold.
Figure 9B:
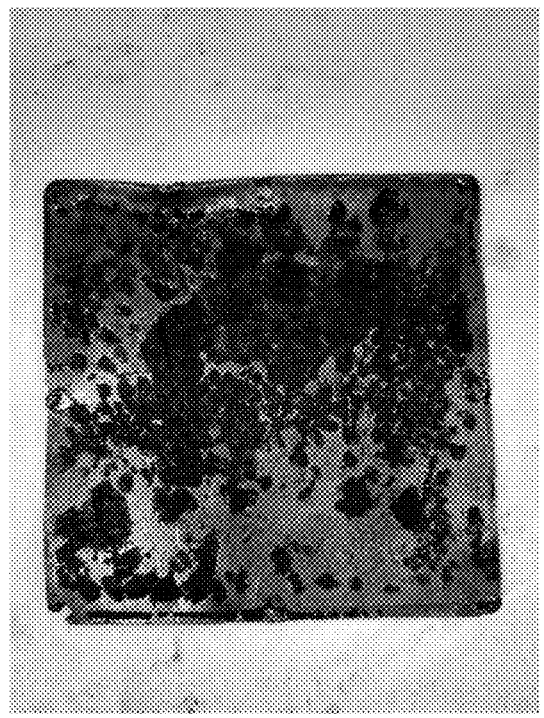
FIG. 9B illustrates contact surface of lead-carbon electrode sheet 11182 to concave mold of hot press mold.

As indicated in FIG. 9A is contact surface of lead-carbon electrode sheet 11182 to convex mold of hot press mold. As indicated in FIG. 9B is contact surface of lead-carbon electrode sheet 11182 to concave mold of hot press mold.

Figure 10A:
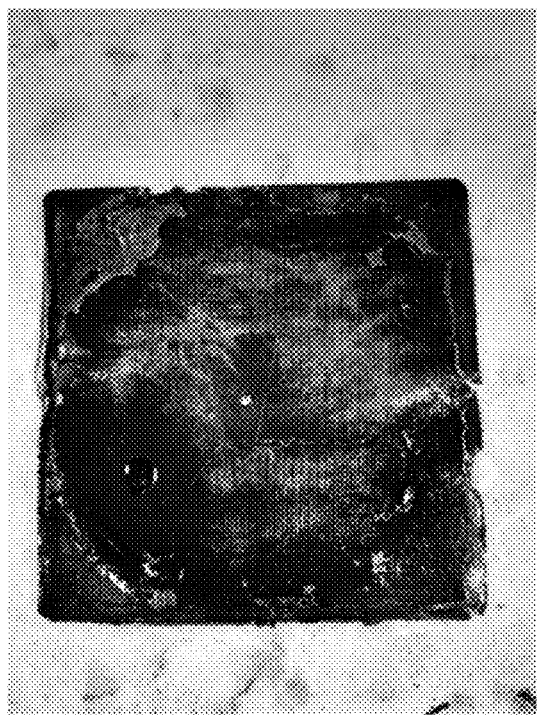
FIG. 10A illustrates contact surface of lead-carbon electrode sheet 11186 to convex mold of hot press mold.
Figure 10B:
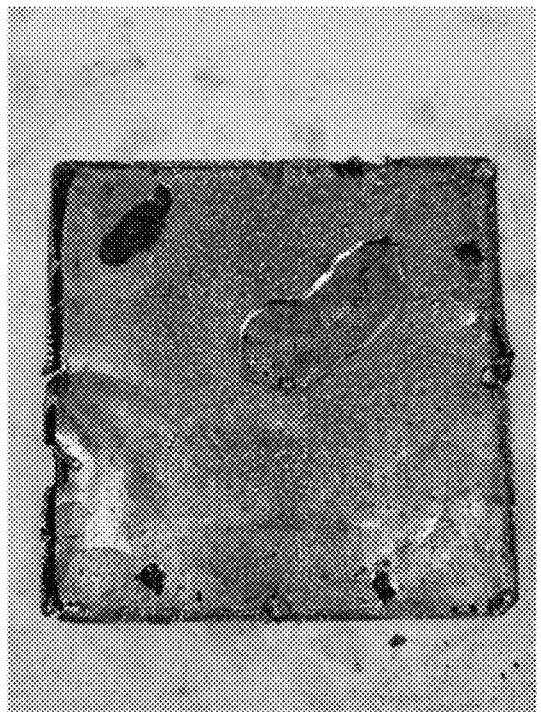
FIG. 10B illustrates contact surface of lead-carbon electrode sheet 11186 to concave mold of hot press mold.

As indicated in FIG. 10A is contact surface of lead-carbon electrode sheet 11186 to convex mold of hot press mold. As indicated in FIG. 10B is contact surface of lead-carbon electrode sheet 11186 to concave mold of hot press mold.

Figure 11A:
FIG. 11A illustrates contact surface of lead-carbon electrode sheet 11187 to convex mold of hot press mold.
Figure 11B:
FIG. 11B illustrates contact surface of lead-carbon electrode sheet 11187 to concave mold of hot press mold.

As indicated in FIG. 11A is contact surface of lead-carbon electrode sheet 11187 to convex mold of hot press mold. As indicated in FIG. 11B is contact surface of lead-carbon electrode sheet 11187 to concave mold of hot press mold.

The dark fragments at surface of the lead-carbon electrode sheets as indicated in FIG. 8, FIG. 9, FIG. 10 and FIG. 11 are carbonized paper under high temperature. The dark fragments were brushed away by copper brush after hot press mold was removed from the lead-carbon electrode sheets.

Example 2

Lead material, carbon cloth, paper and carbon sheet were weighed and placed in concave groove of concave mold in an order of lead material, carbon cloth, lead material, 2 papers and 2 carbon sheets. In example 1, the carbon cloth was fireproof fiber cloth (TCF) was produced by Taiwan Carbon Technology Co., Ltd. The lead-carbon sandwich was covered by convex mold of hot press mold, and then the hot press mold was locked by screws. A temperature sensor was then placed to convex mold and concave mold, respectively. The foregoing hot press mold was transferred to a hot press and pressurized until heating plate contacts convex mold and concave mold and then to 90 kg/cm². The hot press was heated to 300° C. and screws were tightened again. When concave mold was heated to 320° C. and temperature was held at 320° C. In 20 minutes, entire hot press mold was heated to 360° C. and heating sequence was terminated. Hot press mold was cooled down naturally to 300° C. and unloaded from the hot press. Hot press mold was then removed and lead-carbon electrode sheet was obtained.

Please refer to FIG. 12A to FIG. 13B, lead-carbon electrode sheets made in this example are designated as 05241 and 05242. Lead-carbon electrode sheet 05241 and lead-carbon electrode sheet 05242 were removed of hot press mold. Dark fragments at surface of the lead-carbon electrode sheets were cleaned by copper brush. It could be clearly observed that surface of the lead-carbon electrode sheets was multi-porous.

Figure 12A:
FIG. 12A illustrates contact surface of lead-carbon electrode sheet 05241 to convex mold of hot press mold.
Figure 12B:
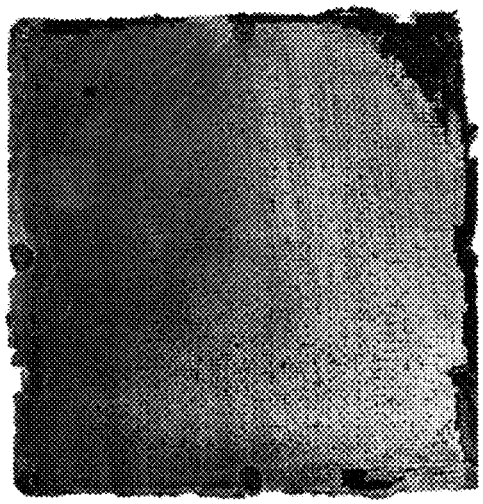
FIG. 12B illustrates contact surface of lead-carbon electrode sheet 05241 to concave mold of hot press mold.

As indicated in FIG. 12A is contact surface of lead-carbon electrode sheet 05241 to convex mold of hot press mold. As indicated in FIG. 12B is contact surface of lead-carbon electrode sheet 05241 to concave mold of hot press mold.

Figure 13A:
FIG. 13A illustrates contact surface of lead-carbon electrode sheet 05242 to convex mold of hot press mold.
Figure 13B:
FIG. 13B illustrates contact surface of lead-carbon electrode sheet 05242 to concave mold of hot press mold.

As indicated in FIG. 13A is contact surface of lead-carbon electrode sheet 05242 to convex mold of hot press mold. As indicated in FIG. 13B is contact surface of lead-carbon electrode sheet 05242 to concave mold of hot press mold.

Example 3

Lead material, carbon cloth, paper and carbon sheet were weighed and placed in concave groove of concave mold in an order of lead material, carbon cloth, lead material, 2 papers and 2 carbon sheets. In example 3, the carbon cloth was fireproof fiber cloth (TCF) was produced by Taiwan Carbon Technology Co., Ltd. The lead-carbon sandwich was covered by convex mold of hot press mold, and then the hot press mold was locked by screws. A temperature sensor was then placed to convex mold and concave mold, respectively. The foregoing hot press mold was transferred to a hot press and pressurized until heating plate contacts convex mold and concave mold and then to 60 kg/cm². The hot press was heated to 300° C. and screws were tightened again. When concave mold was heated to 320° C. and temperature was held at 320° C. In 20 minutes, temperature was held and the hot press was pressurized to 90 kg/cm². Subsequently, the heater started to cool down. Hot press mold was cooled down naturally to 300° C. and unloaded from the hot press. Hot press mold was then removed and lead-carbon electrode sheet was obtained. The lead-carbon electrode sheets were then heat processed at 600° C. in a heat process furnace. The furnace was depressurized and the lead-carbon electrode sheets were transferred to the furnace. The furnace was locked by screws. An air pump was turned on and the furnace was depressurized to −760 mmHg. A nitrogen bottle was opened to adjust pressure to −500 mmHg. The furnace was heated after nitrogen bottle was closed. The furnace was heated from 0-600° C. in 2 hours and the temperature was held at 600° C. for further 2 hours before the lead-carbon electrode sheets were removed from the furnace.

Please refer to FIG. 14A to 15B, lead-carbon electrode sheets made in example 3 are designated 10271 and 10272.

Figure 14A:
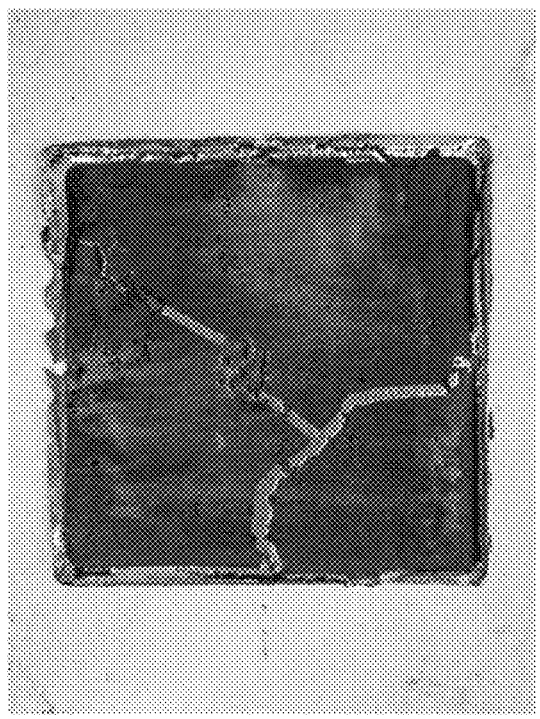
FIG. 14A illustrates contact surface of lead-carbon electrode sheet 10271 to convex mold of hot press mold.
Figure 14B:
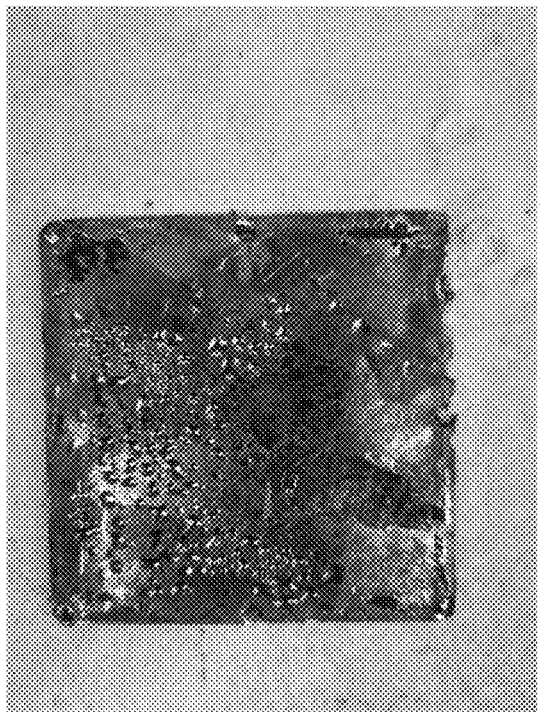
FIG. 14B illustrates contact surface of lead-carbon electrode sheet 10271 to concave mold of hot press mold.

As indicated in FIG. 14A is contact surface of lead-carbon electrode sheet 10271 to convex mold of hot press mold. As indicated in FIG. 14B is contact surface of lead-carbon electrode sheet 10271 to concave mold of hot press mold.

Figure 15A:
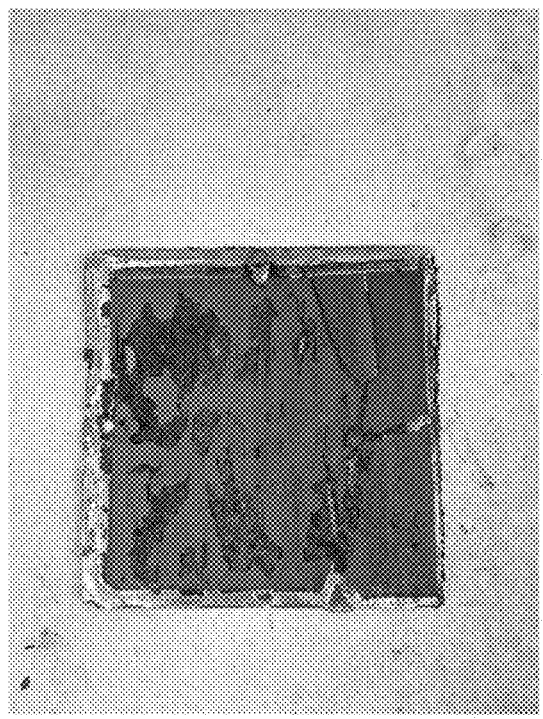
FIG. 15A illustrates contact surface of lead-carbon electrode sheet 10272 to convex mold of hot press mold.
Figure 15B:
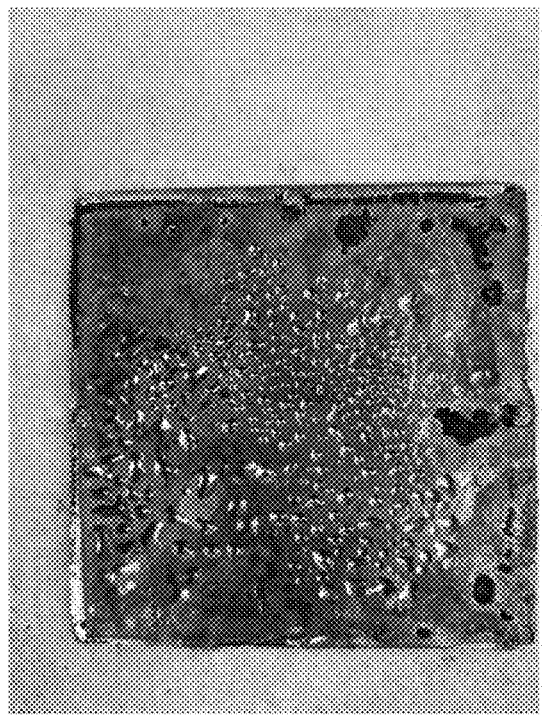
FIG. 15B illustrates contact surface of lead-carbon electrode sheet 10272 to concave mold of hot press mold.

As indicated in FIG. 15A is contact surface of lead-carbon electrode sheet 10272 to convex mold of hot press mold. As indicated in FIG. 15B is contact surface of lead-carbon electrode sheet 10272 to concave mold of hot press mold.

Dark fragments at surface of the foregoing lead-carbon electrode sheets shown in FIG. 14A and FIG. 15A are carbonized paper under high temperature. The dark fragments were cleaned by copper brush after lead-carbon electrode sheets were removed from hot press mold.

Example 4

Lead material, carbon cloth, paper and carbon sheet were weighed and placed in concave groove of concave mold in an order of lead material, carbon cloth, lead material, 2 papers and 2 carbon sheets. In example 4, the carbon cloth was activated carbon fiber (ECF) produced by Chemviron Carbon SA. ECF was oxidized by chemical oxidation to form CoxECF. The CoxECF possesses a full spectrum of functional groups including phenol

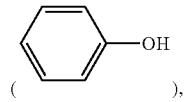

carboxyl (R—COOH), carbonyl (R—C=O), aromatic carbon (R—C—C/C=C), hydroxyl (R—OH) and epoxy

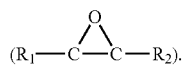

The lead-carbon sandwich was covered by convex mold of hot press mold, and then the hot press mold was locked by screws. A temperature sensor was then placed to convex mold and concave mold, respectively. The foregoing hot press mold was transferred to a hot press and pressurized until heating plate contacts convex mold and concave mold and then to 90 kg/cm². The hot press was heated to 300° C. and screws were tightened again. When concave mold was heated to 320° C. and temperature was held at 320° C. In 5 minutes, entire hot press mold was heated to 360° C. and heating sequence was terminated. Hot press mold was cooled down naturally to 300° C. and unloaded from the hot press. Hot press mold was then removed and lead-carbon electrode sheet was obtained. The lead-carbon electrode sheets were then heat-processed at 600° C. in a heat process furnace. The furnace was depressurized and the lead-carbon electrode sheets were transferred to the furnace. The furnace was locked by screws. An air pump was turned on and the furnace was depressurized to −760 mmHg. A nitrogen bottle was opened to adjust pressure to −500 mmHg. The furnace was heated after nitrogen bottle was closed. The furnace was heated from 0-600° C. in 2 hours and the temperature was held at 600° C. for further 4 hours before the lead-carbon electrode sheets were removed from the furnace.

Please refer to FIG. 14A to 15B, lead-carbon electrode sheets made in example 4 are designated 12211, 12212, 12213, 12214, 12231.

Figure 16A:
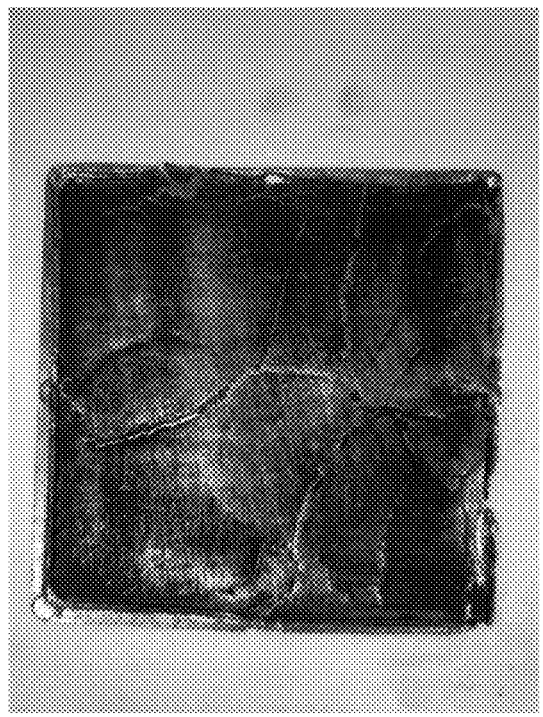
FIG. 16A illustrates contact surface of lead-carbon electrode sheet 12211 to convex mold of hot press mold.
Figure 16B:
FIG. 16B illustrates contact surface of lead-carbon electrode sheet 12211 to concave mold of hot press mold.

As indicated in FIG. 16A is contact surface of lead-carbon electrode sheet 12211 to convex mold of hot press mold. As indicated in FIG. 16B is contact surface of lead-carbon electrode sheet 12211 to concave mold of hot press mold.

Figure 17A:
FIG. 17A illustrates contact surface of lead-carbon electrode sheet 12212 to convex mold of hot press mold.
Figure 17B:
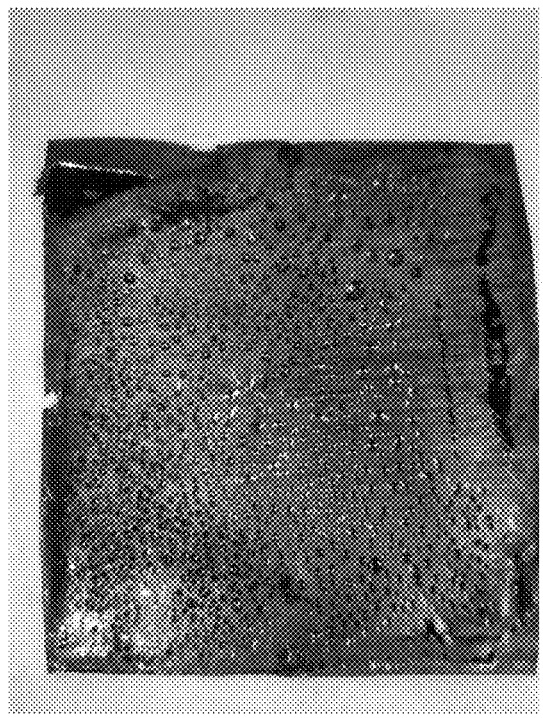
FIG. 17B illustrates contact surface of lead-carbon electrode sheet 12212 to concave mold of hot press mold.

As indicated in FIG. 17A is contact surface of lead-carbon electrode sheet 12212 to convex mold of hot press mold. As indicated in FIG. 17B is contact surface of lead-carbon electrode sheet 12212 to concave mold of hot press mold.

Figure 18A:
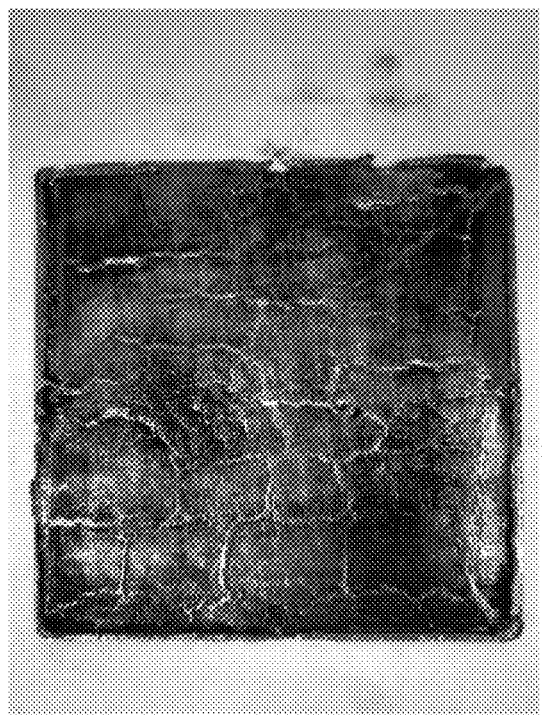
FIG. 18A illustrates contact surface of lead-carbon electrode sheet 12213 to convex mold of hot press mold.
Figure 18B:
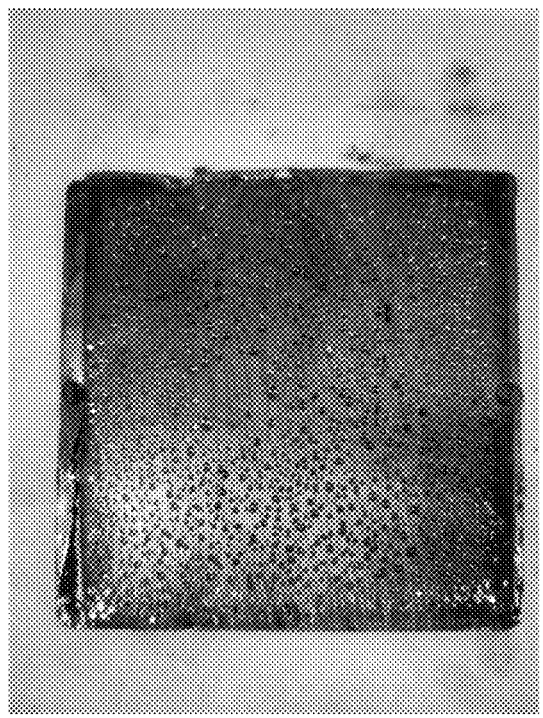
FIG. 18B illustrates contact surface of lead-carbon electrode sheet 12213 to concave mold of hot press mold.

As indicated in FIG. 18A is contact surface of lead-carbon electrode sheet 12213 to convex mold of hot press mold. As indicated in FIG. 18B is contact surface of lead-carbon electrode sheet 12213 to concave mold of hot press mold.

Figure 19A:
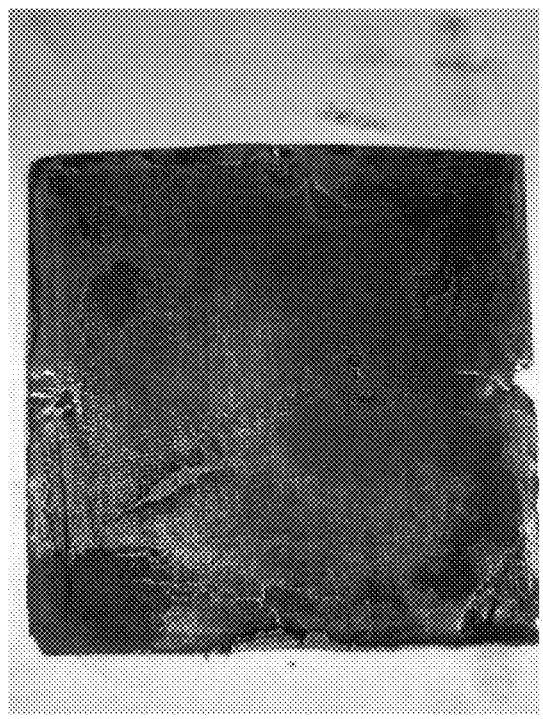
FIG. 19A illustrates contact surface of lead-carbon electrode sheet 12214 to convex mold of hot press mold.
Figure 19B:
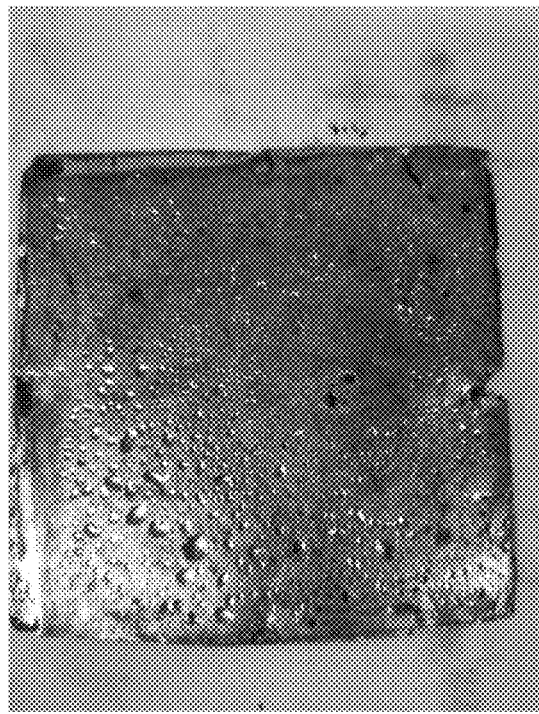
FIG. 19B illustrates contact surface of lead-carbon electrode sheet 12214 to concave mold of hot press mold.

As indicated in FIG. 19A is contact surface of lead-carbon electrode sheet 12214 to convex mold of hot press mold. As indicated in FIG. 19B is contact surface of lead-carbon electrode sheet 12214 to concave mold of hot press mold.

Figure 20A:
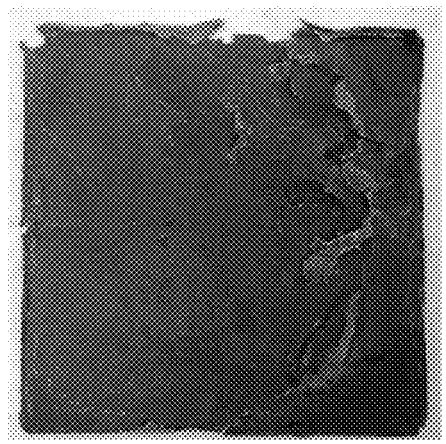
FIG. 20A illustrates contact surface of lead-carbon electrode sheet 12231 to convex mold of hot press mold.
Figure 20B:
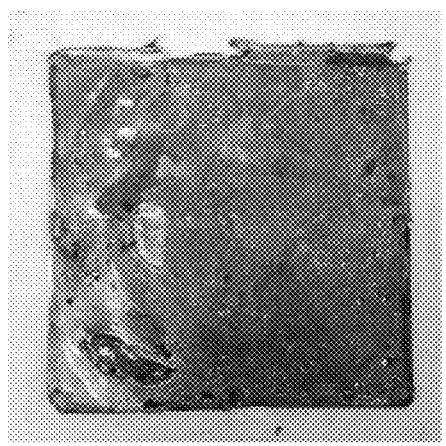
FIG. 20B illustrates contact surface of lead-carbon electrode sheet 12231 to concave mold of hot press mold.

As indicated in FIG. 20A is contact surface of lead-carbon electrode sheet 12231 to convex mold of hot press mold. As indicated in FIG. 20B is contact surface of lead-carbon electrode sheet 12231 to concave mold of hot press mold.

Dark fragments at surface of the foregoing lead-carbon electrode sheets shown in FIG. 16A, FIG. 17A, FIG. 18A, FIG. 19A, and FIG. 20A are carbonized paper under high temperature. The dark fragments were cleaned by copper brush after lead-carbon electrode sheets were removed from hot press mold.

Example 5

A lead-carbon battery LCFN4_N was composed of lead-carbon electrode sheets made in example 1. The lead-carbon battery LCFN4_N comprises a cathode contact point, an anode contact points, and 40 mL sulfuric acid was poured in the battery as electrolyte. The cathode contact point was connected to a cathode electrode sheet cassette. The cathode electrode sheet cassette was composed of electrode sheets LCFN4_N_C1, LCFN4_N_C2 and 3 absorbable glass fiber pads and placed in the sulfuric acid solution. The anode contact point was connected to an anode electrode sheet cassette. The anode electrode sheet cassette was composed of electrode sheets LCFN4_N_A1, LCFN4_N_A2, LCFN4_N_A3 and 2 absorbable glass fiber pads and placed in the sulfuric acid solution. In Table 2, sizes and weighs of lead material of the aforementioned electrode sheets are listed down.

TABLE 2

| | Number | Size | Weigh (g) |
|---|---|---|---|
| Cathode | LCFN4_N_C1 | H: 0.75 mm, L: 66.70 mm, W: 40.50 mm | 11.31 |
| | LCFN4_N_C2 | H: 0.80 mm, L: 67.20 mm, W: 40.50 mm | 17.21 |
| Anode | LCFN4_N_A1 | H: 0.95 mm, L: 66.50 mm, W: 40.00 mm | 16.66 |
| | LCFN4_N_A2 | H: 0.80 mm, L: 66.85 mm, W: 40.70 mm | 14.67 |
| | LCFN4_N_A3 | H: 0.90 mm, L: 66.60 mm, W: 40.70 mm | 16.89 |

Example 6

A lead-carbon battery LCFN3_HP was composed of lead-carbon electrode sheets made in example 4. The lead-carbon battery LCFN3_HP comprises a cathode contact point, an anode contact points, and 40 mL sulfuric acid was poured in the battery as electrolyte. The cathode contact point was connected to a cathode electrode sheet cassette. The cathode electrode sheet cassette was composed of electrode sheets LCFN3_HP_C1, LCFN3_HP_C2, LCFN3_HP_C3 and 2 absorbable glass fiber pads and placed in the sulfuric acid solution. The anode contact point was connected to an anode electrode sheet cassette. The anode electrode sheet cassette was composed of electrode sheets LCFN3_HP_A1, LCFN3_HP_A2 and 3 absorbable glass fiber pads and placed in the sulfuric acid solution. In Table 3, sizes and weighs of lead material of the aforementioned electrode sheets in example 6 are listed down.

TABLE 3

| | Number | Size | Weigh (g) |
|---|---|---|---|
| Cathode | LCFN3_HP_C1 | H: 0.95 mm, L: 66.50 mm, W: 40.00 mm | 16.85 |
| | LCFN3_HP_C2 | H: 0.80 mm, L: 66.00 mm, W: 39.00 mm | 9.66 |
| | LCFN3_HP_C3 | H: 1.70 mm, L: 66.70 mm, W: 40.50 mm | 12.68 |
| Anode | LCFN3_HP_A1 | H: 0.75 mm, L: 66.70 mm, W: 40.50 mm | 10.04 |
| | LCFN3_HP_A2 | H: 1.70 mm, L: 66.70 mm, W: 40.50 mm | 12.69 |

Example 7

A lead-carbon battery LCFN28_2 was composed of lead-carbon electrode sheets made in example 3. The lead-carbon battery LCFN28_2 comprises a cathode contact point, an anode contact points, and 40 mL sulfuric acid was poured in the battery as electrolyte. The cathode contact point was connected to a cathode electrode sheet cassette. The cathode electrode sheet cassette was composed of electrode sheets LCFN28_2_C1, LCFN28_2_C2 and 3 absorbable glass fiber pads and placed in the sulfuric acid solution. The anode contact point was connected to an anode electrode sheet cassette. The anode electrode sheet cassette was composed of electrode sheets LCFN28_2_A1, LCFN28_2_A2, LCFN28_2_A3 and 2 absorbable glass fiber pads and placed in the sulfuric acid solution.

In Table 4, sizes and weighs of lead material of the aforementioned electrode sheets in example 7 are listed down.

TABLE 4

|  | Number | Size | Weigh (g) |
|---|---|---|---|
| Cathode | LCFN28_2_C1 | H: 1.00 mm, L: 66.00 mm, W: 39.00 mm | 19.1 |
|  | LCFN28_2_C2 | H: 1.00 mm, L: 66.00 mm, W: 39.00 mm | 22.8 |
| Anode | LCFN28_2_A1 | H: 1.00 mm, L: 66.00 mm, W: 39.00 mm | 15.3 |
|  | LCFN28_2_A2 | H: 1.00 mm, L: 66.00 mm, W: 39.00 mm | 14.6 |
|  | LCFN28_2_A3 | H: 1.00 mm, L: 66.00 mm, W: 39.00 mm | 12.7 |

Experimental Example 1

Lead-carbon battery LCFN4_N in example 5 and lead-carbon battery LCFN3_HP in example 6 were tested by cyclic unsaturated charge and discharge at a constant current. The batteries were charged at 2 C current for 420 seconds and discharged at 10 C current. Cyclic unsaturated charge and discharge repeated for 3 times. Time and electric current of charge and discharge were recorded for calculating Coulomb efficiency (charge capacity/discharge capacity, %). Please refer to Table 5. Lead-carbon battery LCFN4_N showed electric capacity of 0.3 Ah, and charge capacity is 0.070 Ah after being charged for 420 seconds at 2 C (0.6 A). LCFN4_N was discharged at 10 C (3 A) for 84 seconds and discharge capacity 0.070 Ah could be calculated. Coulomb efficiency of LCFN4_N could be calculated to be 100%. Lead-carbon battery LCFN3_HP showed electric capacity of 0.15 Ah, and charge capacity was 0.035 Ah after being charged for 420 seconds at 2 C (0.3 A). LCFN3_HP was discharged at 10 C (1.5 A) for 86 seconds and discharge capacity 0.035 Ah could be calculated. Coulomb efficiency of LCFN3_HP could be calculated to be 100%.

TABLE 5

| Number | Battery capacity (Ah) | 2 C charging time (sec) | Charging capacity (Ah) | 10 C charging time (sec) | Discharging capacity (Ah) | Coulomb efficiency (%) |
|---|---|---|---|---|---|---|
| LCFN4_N | 0.3 | 420 | 0.070 | 84 | 0.070 | 100% |
| LCFN3_HP | 0.15 | 420 | 0.035 | 86 | 0.035 | 100% |

Experimental Example 2

Lead-carbon battery LCFN4_N was tested by cyclic saturated/unsaturated charge and discharge at a constant current. The battery was charged at constant current 2 and discharged at constant current 10 C. Cut-off voltage was 0.5V and continuous test was performed with data recording every 30 seconds. Time and current of charge and discharge were recorded for calculating coulomb efficiency (charge capacity/discharge capacity, %).

Please refer to Table 6 which records charge and discharge of lead-carbon battery LCFN4_N made in example 5. LCFN4_N has electric capacity of 0.30 Ah. During cycle 1-4, LCFN4_N was saturatedly charged in 1800 seconds and discharged for 150 seconds. Charge capacity was 0.3 Ah and Coulomb efficiency was about 40%. During cycle 5~8, LCFN4_N was unsaturatedly charged in 900 seconds and discharged for 139~145 seconds, demonstrating Coulomb efficiency of 80%. During cycle 9~15, LCFN4_N was unsaturatedly charged in 420 seconds and discharged for 81~95 seconds respectively, demonstrating Coulomb efficiency 100%. During cycle 16~19, LCFN4_N was unsaturatedly charged in 240~268 seconds and discharged for 48~59 seconds respectively, demonstrating Coulomb efficiency of 100%.

TABLE 6

| Cycle | Current (A) | Voltage (V) | Charge capacity (Ah) | Discharge capacity (Ah) | Charge Energy (Wh) | Discharge energy (Wh) | Charge time (s) | Discharge time (s) | $V_{max}$ on cycle |
|---|---|---|---|---|---|---|---|---|---|
| 1 | −2.999 | 0.499 | 0.300 | 0.120 | 0.763 | 0.178 | 1800.0 | 143.8 | 2.69 |
| 2 | −2.999 | 0.499 | 0.300 | 0.124 | 0.766 | 0.183 | 1800.0 | 148.8 | 2.69 |
| 3 | −2.999 | 0.499 | 0.300 | 0.125 | 0.763 | 0.184 | 1800.0 | 149.7 | 2.69 |
| 4 | −2.999 | 0.499 | 0.300 | 0.124 | 0.762 | 0.184 | 1800.0 | 149.3 | 2.69 |
| 5 | −2.999 | 0.499 | 0.150 | 0.120 | 0.359 | 0.182 | 900.0 | 144.5 | 2.66 |
| 6 | −2.999 | 0.499 | 0.150 | 0.117 | 0.360 | 0.178 | 900.0 | 140.8 | 2.66 |
| 7 | −2.999 | 0.499 | 0.150 | 0.116 | 0.361 | 0.176 | 900.0 | 139.3 | 2.67 |
| 8 | −2.999 | 0.499 | 0.150 | 0.115 | 0.361 | 0.176 | 900.0 | 138.8 | 2.67 |

TABLE 6-continued

| Cycle | Current (A) | Voltage (V) | Charge capacity (Ah) | Discharge capacity (Ah) | Charge Energy (Wh) | Discharge energy (Wh) | Charge time (s) | Discharge time (s) | $V_{max}$ on cycle |
|---|---|---|---|---|---|---|---|---|---|
| 9  | -2.999 | 0.499 | 0.070 | 0.079 | 0.159 | 0.124 | 420.0 | 94.5 | 2.35 |
| 10 | -2.999 | 0.499 | 0.070 | 0.072 | 0.160 | 0.115 | 420.0 | 86.3 | 2.36 |
| 11 | -2.999 | 0.499 | 0.070 | 0.069 | 0.160 | 0.113 | 420.0 | 83.6 | 2.37 |
| 12 | -2.999 | 0.499 | 0.070 | 0.069 | 0.160 | 0.112 | 420.0 | 82.6 | 2.38 |
| 13 | -2.999 | 0.499 | 0.070 | 0.068 | 0.160 | 0.112 | 420.0 | 82.1 | 2.39 |
| 14 | -2.999 | 0.499 | 0.070 | 0.068 | 0.160 | 0.112 | 420.0 | 81.9 | 2.40 |
| 15 | -2.999 | 0.499 | 0.070 | 0.068 | 0.160 | 0.113 | 420.0 | 81.8 | 2.41 |
| 16 | -2.999 | 0.499 | 0.045 | 0.050 | 0.101 | 0.084 | 268.3 | 81.9 | 2.31 |
| 17 | -2.999 | 0.499 | 0.040 | 0.043 | 0.090 | 0.072 | 240.0 | 59.9 | 2.31 |
| 18 | -2.999 | 0.499 | 0.040 | 0.041 | 0.090 | 0.069 | 240.0 | 49.2 | 2.31 |
| 19 | -2.999 | 0.499 | 0.040 | 0.040 | 0.090 | 0.069 | 240.0 | 48.5 | 2.31 |

Experimental Example 3

Lead-carbon battery LCFN3_HP was tested by cyclic saturated/unsaturated charge and discharge at a constant current. The battery was charged at constant current 2 and discharged at constant current 10 C. Cut-off voltage was 0.5V and continuous test was performed with data recording every 30 seconds. Time and current of charge and discharge were recorded for calculating coulomb efficiency (charge capacity/discharge capacity, %). Please refer to Table 6 which records charge and discharge of lead-carbon battery LCFN3_HP made in example 6. LCFN3_HP has electric capacity of 0.15 Ah. During cycle 1, LCFN3_HP was uncharged. During cycle 2-4, LCFN3_HP was saturatedly charged in 1800 seconds and discharged for 100 seconds. Charge capacity was 0.15 Ah and Coulomb efficiency was about 30%. During cycle 5~7, LCFN3_HP was unsaturatedly charged in 900 seconds and discharged for 100 seconds, demonstrating Coulomb efficiency of 60%. During cycle 8~14, LCFN3_HP was unsaturatedly charged in 420 seconds and discharged for 86~100 seconds respectively, demonstrating Coulomb efficiency of 100%.

Experimental Example 4

Lead-carbon battery LCFN28_2 was tested by cyclic saturated/unsaturated charge and discharge at a constant current. The battery was charged at constant current 2 C and discharged at constant current 10 C. Cut-off voltage was 0.5V and continuous test was performed with data recording every 5 seconds. Time and current of charge and discharge were recorded for calculating coulomb efficiency (charge capacity/discharge capacity, %). Please refer to Table 8 which records charge and discharge of lead-carbon battery LCFN28_2 made in example 7. LCFN28_2 has electric capacity of 0.17 Ah. During cycle 1-3, LCFN28_2 was saturatedly charged in 900 seconds and discharged for 118, 130, 132 seconds respectively. Charge capacities were all 0.17 Ah and Coulomb efficiencies were about 59, 65, 66%. During cycle 4~8, LCFN28_2 was unsaturatedly charged in 420 seconds and discharged for 111~96 seconds, pausing for 30 seconds after discharging. The battery demonstrates Coulomb efficiency of 103~119%. During cycle 9~21, LCFN28_2 was unsaturatedly charged in 240 seconds and discharged for 53~72 seconds respectively, pausing for 30 seconds after discharging. The battery demonstrates Coulomb efficiency of 99~135%.

TABLE 7

| Cycle | Current (A) | Voltage (V) | Charge capacity (Ah) | Discharge capacity (Ah) | Charge Energy (Wh) | Discharge energy (Wh) | Charge time (s) | Discharge time (s) | $V_{max}$ on cycle |
|---|---|---|---|---|---|---|---|---|---|
| 1  | -0.070 | 0.490 | 0.000 | 0.126 | 0.000 | 0.233 | 0.0    | 6473  | 2.151 |
| 2  | -1.490 | 0.490 | 0.150 | 0.043 | 0.387 | 0.060 | 1800.0 | 102.9 | 2.775 |
| 3  | -1.490 | 0.490 | 0.150 | 0.043 | 0.403 | 0.059 | 1800.0 | 103.5 | 2.793 |
| 4  | -1.490 | 0.490 | 0.150 | 0.044 | 0.404 | 0.061 | 1800.0 | 105.5 | 2.800 |
| 5  | -1.490 | 0.490 | 0.075 | 0.044 | 0.194 | 0.060 | 900.0  | 104.6 | 2.803 |
| 6  | -1.490 | 0.490 | 0.075 | 0.044 | 0.194 | 0.060 | 900.0  | 104.6 | 2.806 |
| 7  | -1.490 | 0.490 | 0.075 | 0.044 | 0.194 | 0.061 | 900.0  | 105.0 | 2.806 |
| 8  | -1.490 | 0.490 | 0.035 | 0.041 | 0.083 | 0.060 | 420.0  | 99.2  | 2.589 |
| 9  | -1.490 | 0.490 | 0.035 | 0.039 | 0.082 | 0.059 | 420.0  | 94.6  | 2.504 |
| 10 | -1.490 | 0.490 | 0.035 | 0.037 | 0.082 | 0.057 | 420.0  | 90.6  | 2.487 |
| 11 | -1.490 | 0.490 | 0.035 | 0.036 | 0.082 | 0.056 | 420.0  | 88.7  | 2.481 |
| 12 | -1.490 | 0.490 | 0.035 | 0.036 | 0.082 | 0.055 | 420.0  | 87.7  | 2.478 |
| 13 | -1.490 | 0.490 | 0.035 | 0.036 | 0.082 | 0.054 | 420.0  | 86.6  | 2.474 |
| 14 | -1.490 | 0.490 | 0.035 | 0.036 | 0.082 | 0.054 | 420.0  | 86.1  | 2.476 |

TABLE 8

| Cycle | Current (A) | Voltage (V) | Charge capacity (Ah) | Discharge capacity (Ah) | Charge power (Wh) | Discharge power (Wh) | Charge time (sec) | Discharge time (sec) | Cut-off voltage (V) | Coulomb efficiency (%) |
|---|---|---|---|---|---|---|---|---|---|---|
| 1 | −3.41 | 0.50 | 0.17 | 0.10 | 0.40 | 0.14 | 900.00 | 118.12 | 2.48 | 59.09 |
| 2 | −3.41 | 0.50 | 0.17 | 0.11 | 0.41 | 0.15 | 900.00 | 129.96 | 2.58 | 64.98 |
| 3 | −3.40 | 0.50 | 0.17 | 0.11 | 0.41 | 0.16 | 900.00 | 132.45 | 2.62 | 66.23 |
| 4 | −3.40 | 0.50 | 0.08 | 0.09 | 0.18 | 0.14 | 420.00 | 111.63 | 2.43 | 119.60 |
| 5 | −3.41 | 0.50 | 0.08 | 0.09 | 0.18 | 0.13 | 420.00 | 103.61 | 2.41 | 111.01 |
| 6 | −3.41 | 0.50 | 0.08 | 0.08 | 0.18 | 0.13 | 420.00 | 99.75 | 2.40 | 106.88 |
| 7 | −3.40 | 0.50 | 0.08 | 0.08 | 0.18 | 0.12 | 420.00 | 97.62 | 2.40 | 104.59 |
| 8 | −3.41 | 0.50 | 0.08 | 0.08 | 0.18 | 0.12 | 420.00 | 96.22 | 2.40 | 103.09 |
| 9 | −3.41 | 0.50 | 0.05 | 0.06 | 0.10 | 0.09 | 240.00 | 72.40 | 2.32 | 135.75 |
| 10 | −3.41 | 0.50 | 0.05 | 0.05 | 0.10 | 0.09 | 240.00 | 64.42 | 2.30 | 120.79 |
| 11 | −3.40 | 0.50 | 0.05 | 0.05 | 0.10 | 0.08 | 240.00 | 60.86 | 2.30 | 114.11 |
| 12 | −3.41 | 0.50 | 0.05 | 0.05 | 0.10 | 0.08 | 240.00 | 58.91 | 2.30 | 110.46 |
| 13 | −3.41 | 0.50 | 0.05 | 0.05 | 0.10 | 0.08 | 240.00 | 52.69 | 2.30 | 108.17 |
| 14 | −3.41 | 0.50 | 0.05 | 0.05 | 0.10 | 0.08 | 240.00 | 59.07 | 2.33 | 110.76 |
| 15 | −3.41 | 0.50 | 0.05 | 0.05 | 0.10 | 0.08 | 240.00 | 56.47 | 2.32 | 105.88 |
| 16 | −3.41 | 0.49 | 0.05 | 0.05 | 0.10 | 0.08 | 240.00 | 55.79 | 2.31 | 104.61 |
| 17 | −3.41 | 0.50 | 0.05 | 0.05 | 0.10 | 0.07 | 240.00 | 55.39 | 2.31 | 103.86 |
| 18 | −3.41 | 0.49 | 0.05 | 0.05 | 0.10 | 0.07 | 240.00 | 55.10 | 2.31 | 103.31 |
| 19 | −3.41 | 0.50 | 0.05 | 0.05 | 0.10 | 0.07 | 240.00 | 54.94 | 2.33 | 103.02 |
| 20 | −3.41 | 0.50 | 0.05 | 0.05 | 0.10 | 0.07 | 240.00 | 53.24 | 2.32 | 99.83 |
| 21 | −3.41 | 0.50 | 0.05 | 0.04 | 0.10 | 0.07 | 240.00 | 52.68 | 2.32 | 98.78 |

Figure 21A:
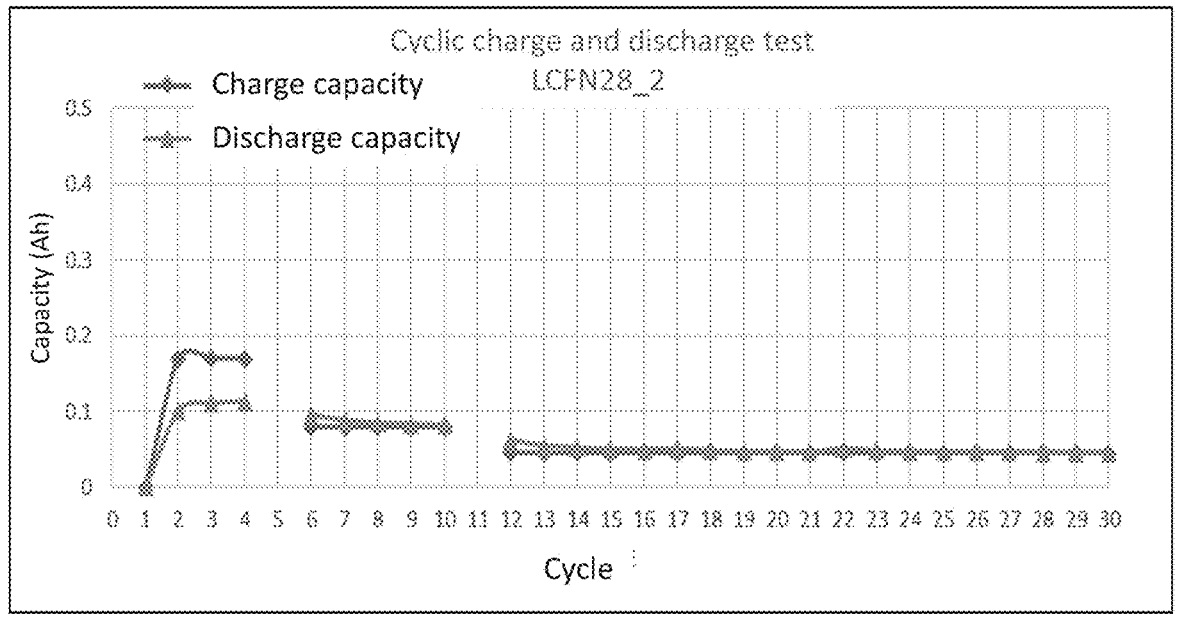
FIG. 21A is a diagram to illustrate a trend of charge-discharge capacity during cyclic charge and discharge of LCFN28_2.
Figure 21B:
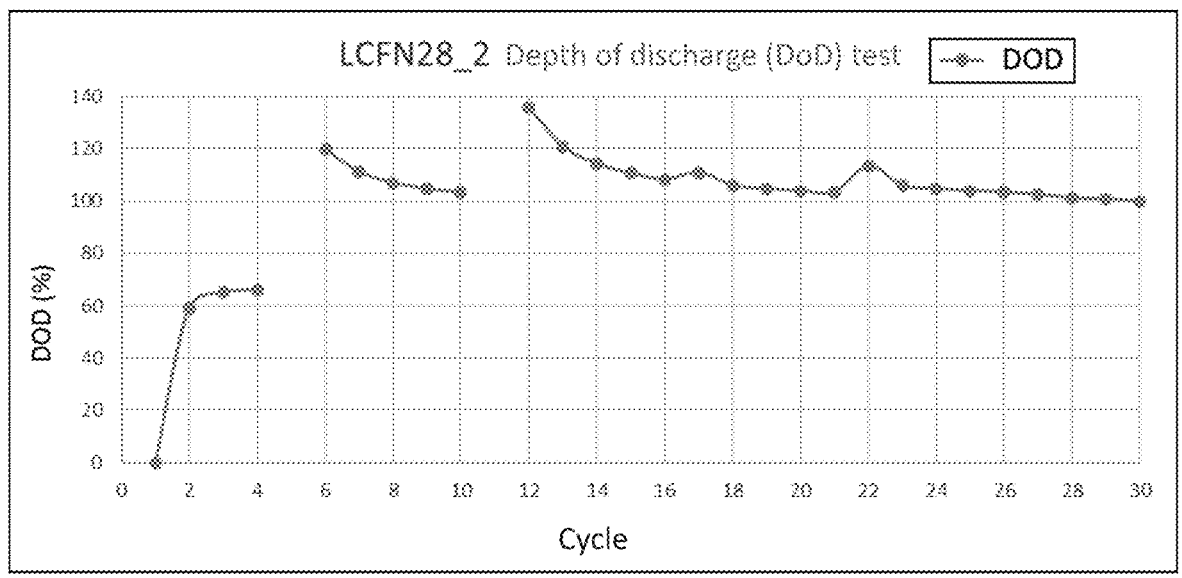
FIG. 21B is a diagram to illustrate a trend of Coulomb efficiency during cyclic charge and discharge of LCFN28_2.

Although the lead-carbon battery LCFN4_N in example 5 and the lead-carbon battery LCFN3_HP in example 6 reached 100% Coulomb efficiency at the $10^{th}$ and $14^{th}$ cycles of charge and discharge respectively, the lead-carbon battery LCFN28_2 in example 7 achieved 100% Coulomb efficiency at a smaller cycle number (the $4^{th}$ cycle of charge and discharge) and resulted in better Coulomb efficiency than LCFN4_N as well as LCFN3_HP. Please refer to FIG. 21A and FIG. 21B, which are trend diagrams of charge-discharge capacity during cyclic charge-discharge and Coulomb efficiency during cyclic charge-discharge of LCFN28_2, respectively. LCFN28_2 reached over 100% of charge and discharge efficiency in a shorter period and demonstrated ability to tolerate shorter cyclic charge and discharge. After being charged for 240 seconds, depth of discharge remained constantly 100% under cyclic tests.

Experimental Example 5

Figure 22A:
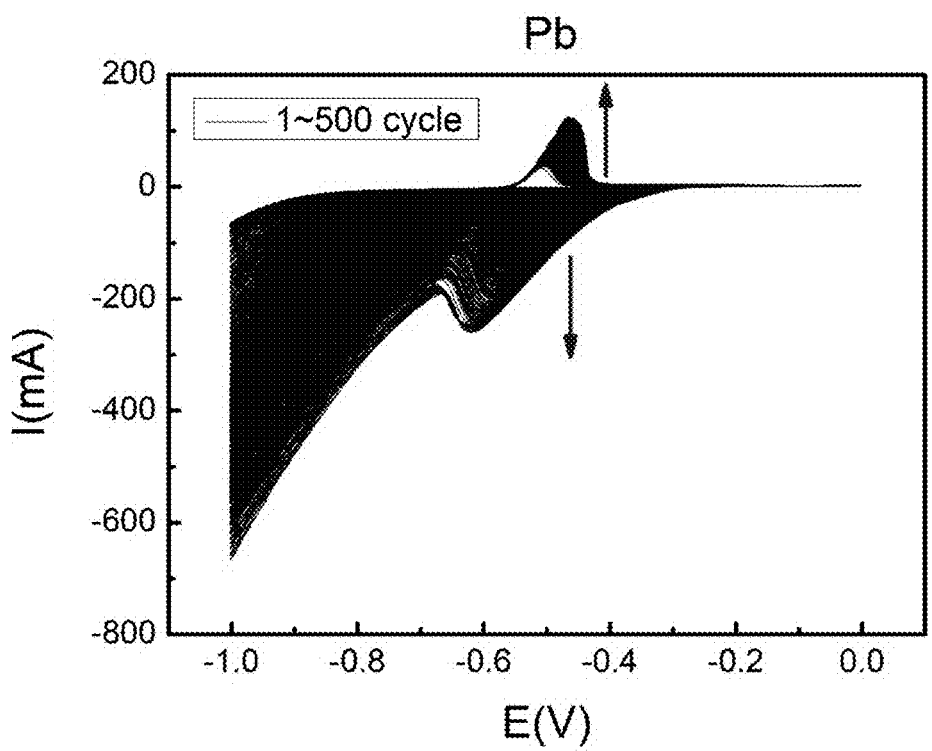
FIG. 22A is a cyclic voltammetry (CV) diagram of pure lead electrode for 500 cycles in example 5.
Figure 22B:
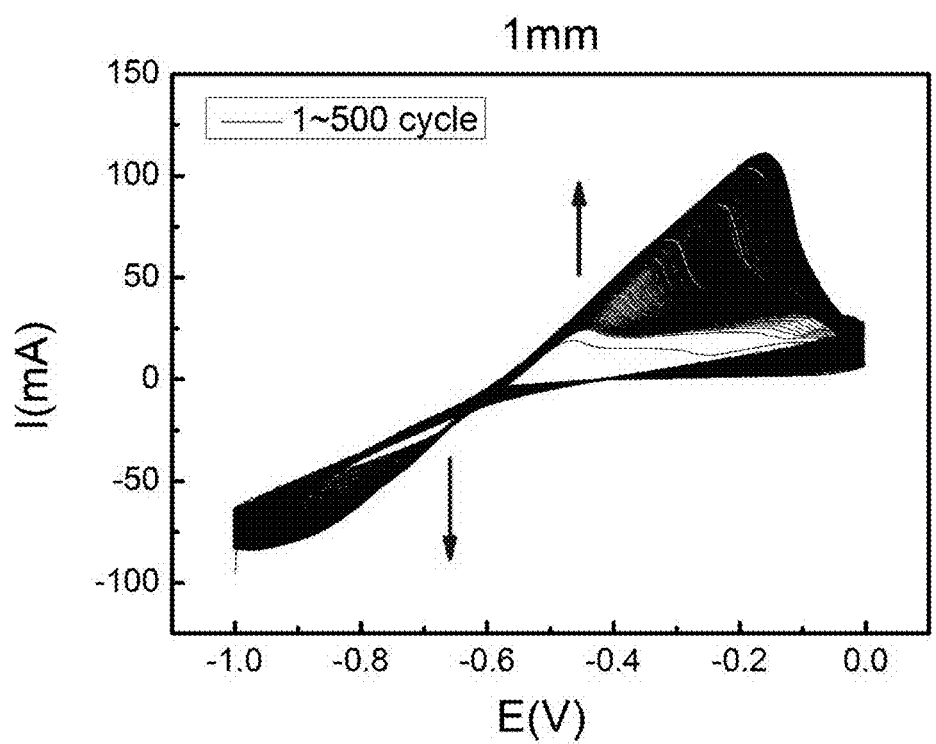
FIG. 22B is a cyclic voltammetry (CV) diagram of lead-carbon sheet for 500 cycles in example 5.

Cyclic voltammetry was performed with a lead-carbon electrode sheet made in example 2 and a pure lead electrode sheet. Testing area of the aforementioned electrode sheets were both 1.0*1.0 cm. Scanning voltage was from −1.0V to 0.0V. Scanning rate was 20 mV/s. To be specific, turning point of redox reaction of the electrode sheets was around −0.6V in this experimental example. In record diagrams of cyclic voltammetry, areas defined by curves on both sides of −0.6V represents tested currents during redox reaction. Please refer to FIG. 22A, which is a cyclic voltammetry (CV) diagram of pure lead electrode for 500 cycles. As for pure lead electrode sheet, the current for reduction was gradually increased during cyclic voltammetry. Current for hydrolysis to produce hydrogen rose from −142 mA to −660 mA. It is obvious that after multiple cycles of charge and discharge, the pure electrode sheet absorbed and consumed a large amount of current during reductive reaction of lead sulfate. Please refer to FIG. 22B, which is a cyclic voltammetry (CV) diagram of lead-carbon sheet for 500 cycles. There was an obvious peak cathodic current of the lead-carbon electrode sheet in the forward scan phase. The peak cathodic current reached 100 mA. However, there was no peak anodic current of the lead-carbon electrode sheet in the reverse scan phase. Besides, in the reverse scan phase, hydrolytic current produced by reduction was relative smaller and peaked at −82 mA. This indicates that under cyclic voltammetry of lead-carbon electrode sheet, the redox reaction is reversible. On the other hand, during charge and discharge, nanoparticles of lead sulfate are formed in pores of the lead-carbon electrode sheet and not only accumulated gradually in the pores but also thickened the lead-carbon electrode sheet. Electric capacity of the lead-carbon electrode sheet is also increased while hydrolytic current of reduction drastically decreased. This indicates that carbon material in the lead-carbon electrode sheet promotes conductivity of electrode sheet, and allows input current to be completely contributed to chemical reaction of lead/lead sulfate and reduces heat loss resulting from hydrolysis.

Figure 22C:
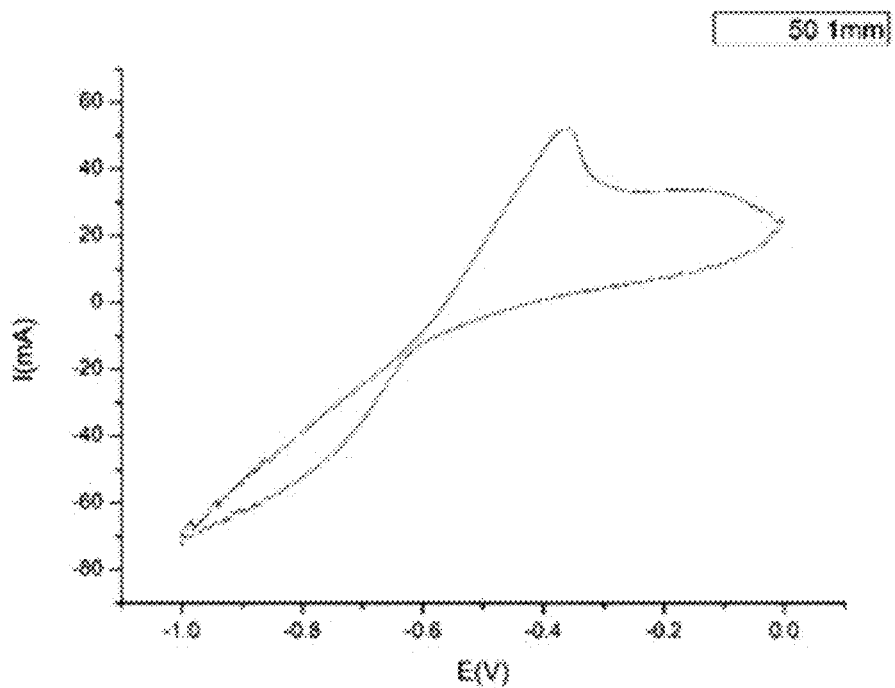
FIG. 22C is a curve record of $50^{th}$ cycle in cyclic voltammetry of lead-carbon electrode sheet in example 5.
Figure 22D:
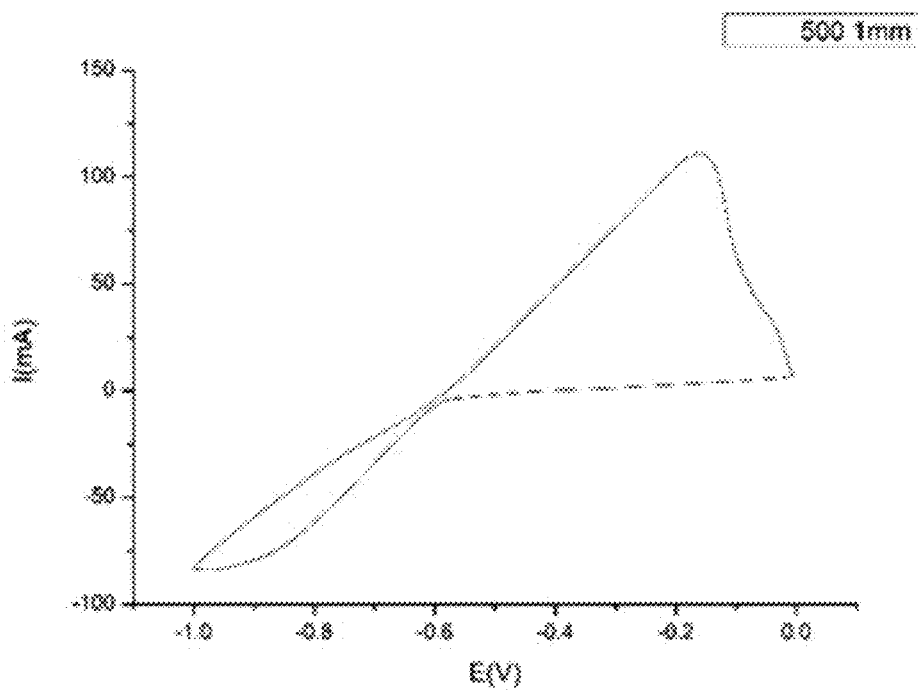
FIG. 22D is a curve record of $500^{th}$ cycle in cyclic voltammetry of lead-carbon electrode sheet in example 5.

Please refer to FIG. 22C and FIG. 22D, which are a cyclic voltammogram lead-carbon electrode sheet at $50^{th}$ cycle and at $500^{th}$ cycle in cyclic voltammetry, respectively. Peak cathodic current at $50^{th}$ cycle reached 52 mA. Peak cathodic current at $500^{th}$ cycle reached 111 mA and definite integrals under oxidation curve was significantly larger than that at $50^{th}$ cycle. It is indicated that electrochemical reaction of the lead-carbon electrode sheet increases as cycles of charge and discharge multiplies.

In sum, the present invention features unprecedent effects as followings:

1. Through design of specific ventilation, when lead-carbon electrode sheet is coupled under a low-temperature condition, a densely coupling of lead and carbon is achieved with carbon material possessing little or no carbonoxy groups. Electric capacity of lead-carbon electrode sheet is also increased and heat loss during charge and discharge is reduced. Energy of charge and discharge is completely consumed during chemical reaction of lead/lead sulfate. Compared with pure lead electrode sheet, the lead-carbon electrode sheet in the present invention features high-density lead-carbon interface, higher charge capacity and higher energy density. The method in the present invention is simple and advantageous for high efficient battery production at low cost.

2. By the method for making lead-carbon electrode sheet, oxygroup for coupling lead-carbon interface is derived by oxidizing lead material in an ambient atmosphere. Therefore, carbon material requires no further oxidative treatment. For example, carbon cloths without carboxyl group (R—COOH) can be utilized. Lead-carbon electrode sheet produced by the method in the present invention has a highly dense lead-carbon interface, higher charge capacity and higher energy density. The method also simplifies manufacturing process and increase efficiency of battery production.

3. The lead-carbon interface promotes nano lead production during unsaturated charge and discharge. Upon lead material with sufficient thickness, 3D nano-porous structure grows naturally along with use of batteries. It can be expected that charge capacity increases as cycle number of charge and discharge increases, and Coulomb efficiency approaches 100% as the cycle number multiplies.

4. The lead-carbon battery in the present invention is supposed to endure over 3000 cycles of charge and discharge with less heat loss and less depletion of electrodes. Moreover, as cycle number of charge and discharge multiplies, electric capacity is amplified and prospective battery life is lengthened. Batteries in the present invention is therefore widely applicable in microgrid power storage of intermittent power generation such as wind, solar or tidal power generation.

As is understood by a person skilled in the art, the aforementioned preferred embodiments of the present invention are illustrated of the present invention rather than limiting of the present invention. In view of the foregoing, it is intended to cover various modifications and similar arrangements included within the spirit and scope of the appended claims. Thus, the scope of which should be accorded the broadest interpretation in order to encompass all such modifications and similar structures.

What is claimed is:

1. A method for making a multi-porous lead-carbon composite electrode comprising steps of:
   providing a first lead material, a second lead material and a carbon material, coupling a first side of the first lead material to one side the carbon material, and coupling a second side of the second lead material to the other side of the carbon material, so that the carbon material is located between the first lead material and the second lead material to form a lead-carbon sandwich, wherein the first lead material is in a sheet form, and the second lead material is in a sheet form;
   placing the lead-carbon sandwich in a hot press mold, wherein the hot press mold comprises:
   a convex mold, the convex mold comprising a plurality of convex mold exhaust holes and a convex mold ventilating groove, the convex mold exhaust holes dispersed evenly along an inner side of convex periphery of the convex mold, the convex mold ventilating groove formed along an outer side of convex periphery of the convex mold; and
   a concave mold, the concave mold comprising a plurality of concave mold exhaust holes and a concave mold ventilating groove, the concave mold exhaust holes dispersed evenly along an inner side of concave periphery of the concave mold corresponding to the convex mold exhaust holes, the concave mold ventilating groove spiraling along the inner side of periphery of the concave mold and towards geometric center of the concave mold;
   wherein the convex mold ventilating groove connects to the concave mold ventilating groove for ventilation when the convex mold combines with the concave mold in a corresponsive manner;
   at a first temperature, producing a swelling pressure from air between the carbon material and the first lead material or the second lead material to ventilate the air; and
   at the first temperature, exerting an external pressure on the lead-carbon sandwich for 2~10 minutes so as to combine the first lead material, the second lead material and the carbon material to form a lead-carbon electrode sheet, wherein the first temperature ranges from 300 to 360° C. and the external pressure ranges from 70 kg/m² to 120 kg/m².

2. The method as claimed in claim 1, wherein the first temperature is 320° C. and the external pressure is 90 kg/m².

3. The method as claimed in claim 1, after the exerting external pressure step, the method further comprises a heat treatment comprising steps of:
   heating the lead-carbon electrode sheet to a third temperature at a depressurized atmosphere; and
   at the third temperature, heat treating the lead-carbon electrode sheet for 1~3 hours, wherein the third temperature ranges from 500 to 700° C. and the depressurized atmosphere ranges from −600 to −400 mmHg.

4. The method as claimed in claim 3, wherein the first temperature is 320° C. and the external pressure is 90 kg/m².

5. The method as claimed in claim 4, wherein the lead-carbon electrode sheet is heat treated for 2 hours, the third temperature is 600° C., and the depressurized atmosphere is −500 mmHg.

6. The method as claimed in claim 3, before providing the carbon material, the method further comprises cutting the carbon material from carbon cloth into carbon pieces or carbon fibers, wherein the carbon material comprises no carboxyl group.

7. The method as claimed in claim 6, wherein the carbon material comprises 45~56% aromatic group, 4~6.5% hydroxyl group, 12~15.5% epoxy group, and 28~33% carbonyl group from atomic perspective.

8. The method as claimed in claim 3, before providing the first lead material and the second lead material, the method further comprises a pre-treatment step the pre-treatment comprising steps of:
   at a second temperature, oxidizing the first lead material and the second lead material in an ambient atmosphere, wherein the second temperature ranges from 0 to 400° C.

9. The method as claimed in claim 8, wherein the first temperature is 320° C. and the external pressure is 90 kg/m², the lead-carbon electrode sheet is heat treated for 2 hours, the third temperature is 600° C., and the depressurized atmosphere is −500 mmHg.

10. An electrode sheet cassette comprising:
    a first lead-carbon electrode sheet made by the method as claimed in claim 1;
    a second lead-carbon electrode sheet made by the method as claimed in claim 1; and
    at least one absorbable glass fiber pad, wherein the absorbable glass fiber pad is provided between the first lead-carbon electrode sheet and the second lead-carbon electrode sheet.

11. The electrode cassette as claimed in claim 10, after the exerting external pressure step, the method further comprises a heat treatment comprising steps of:
    heating the lead-carbon electrode sheet to a third temperature at a depressurized atmosphere; and
    at the third temperature, heat treating the lead-carbon electrode sheet for 1~3 hours, wherein the third temperature ranges from 500 to 700° C. and the depressurized atmosphere ranges from −600 to −400 mmHg.

12. The electrode cassette as claimed in claim 11, before providing the carbon material, the method further comprises cutting the carbon material from carbon cloth into carbon pieces or carbon fibers, wherein the carbon material comprises no carboxyl group.

13. The electrode cassette as claimed in claim 12, wherein the carbon material comprises 45~56% aromatic group, 4~6.5% hydroxyl group, 12~15.5% epoxy group, and 28~33% carbonyl group from atomic perspective.

14. The electrode cassette as claimed in claim 10, before providing the first lead material and the second lead material, the method further comprises a pre-treatment step the pre-treatment comprising steps of:
  at a second temperature, oxidizing the first lead material and the second lead material in an ambient atmosphere, wherein the second temperature ranges from 0 to 400° C.

15. A lead-carbon battery comprising:
  a cathode contact point;
  an anode contact point:
  an electrolyte;
  at least one cathode electrode sheet cassette as the electrode sheet cassette claimed in claim 10, wherein the cathode electrode sheet cassette is provided in the electrolyte and connected to the cathode contact point by wire-welding; and
  at least one anode electrode sheet cassette as the electrode sheet cassette claimed in claim 10, wherein the anode electrode sheet cassette is provided in the electrolyte and connected to the anode contact point by wire-welding.

16. The lead-carbon battery as claimed in claim 15, wherein the first lead material comprises a first welding point at periphery of the first lead material, and the second lead material comprises a second welding point at periphery of the second lead material, wherein the first welding point and the second welding points are for welding the lead-carbon electrode to electrode contact points of the lead-carbon battery.

17. The lead-carbon battery as claimed in claim 16, after the exerting external pressure step, the method further comprises a heat treatment comprising steps of:
  heating the lead-carbon electrode sheet to a third temperature at a depressurized atmosphere; and
  at the third temperature, heat treating the lead-carbon electrode sheet for 1~3 hours, wherein the third temperature ranges from 500 to 700° C. and the depressurized atmosphere ranges from −600 to −400 mmHg.

18. The lead-carbon battery as claimed in claim 16, before providing the carbon material, the method further comprises cutting the carbon material from carbon cloth into carbon pieces or carbon fibers, wherein the carbon material comprises no carboxyl group; wherein the carbon material comprises 45~56% aromatic group, 4~6.5% hydroxyl group, 12~15.5% epoxy group, and 28~33% carbonyl group from atomic perspective.

19. The lead-carbon battery as claimed in claim 16, before providing the first lead material and the second lead material, the method further comprises a pre-treatment step the pre-treatment comprising steps of:
  at a second temperature, oxidizing the first lead material and the second lead material in an ambient atmosphere, wherein the second temperature ranges from 0 to 400° C.

\* \* \* \* \*